(12) United States Patent
Fassbender

(10) Patent No.: US 6,918,253 B2
(45) Date of Patent: *Jul. 19, 2005

(54) POWER SYSTEM WITH ENHANCED THERMODYNAMIC EFFICIENCY AND POLLUTION CONTROL

(75) Inventor: Alexander G. Fassbender, Richland, WA (US)

(73) Assignee: ThermoEnergy Power Systems, LLC, Little Rock, AR (US)

( * ) Notice: Subject to any disclaimer, the term of this patent is extended or adjusted under 35 U.S.C. 154(b) by 104 days.

This patent is subject to a terminal disclaimer.

(21) Appl. No.: 10/181,760
(22) PCT Filed: Jan. 11, 2001
(86) PCT No.: PCT/US01/01011

§ 371 (c)(1),
(2), (4) Date: Jul. 22, 2002

(87) PCT Pub. No.: WO01/51773

PCT Pub. Date: Jul. 19, 2001

(65) Prior Publication Data

US 2003/0037550 A1 Feb. 27, 2003

Related U.S. Application Data

(63) Continuation-in-part of application No. 09/483,677, filed on Jan. 14, 2000, now Pat. No. 6,196,000.

(51) Int. Cl.[7] ............................................. F01K 25/06
(52) U.S. Cl. ............................. 60/649; 60/651; 60/671
(58) Field of Search ........................ 60/648, 649, 651, 60/671, 682

(56) References Cited

U.S. PATENT DOCUMENTS 2,802,114 A 8/1957 Artsay
3,503,208 A 3/1970 Schmidt
3,628,332 A 12/1971 Kelmar
3,736,745 A 6/1973 Karig
3,779,212 A 12/1973 Wagner
4,074,981 A 2/1978 Slater
4,132,065 A 1/1979 McGann
4,202,167 A 5/1980 Suggitt et al.
4,277,944 A 7/1981 Silvestri, Jr.
4,498,289 A 2/1985 Osgerby
4,602,483 A 7/1986 Wilks et al.
4,831,817 A 5/1989 Linhardt
4,896,498 A 1/1990 Knizia
4,974,412 A 12/1990 Schneider
4,999,992 A 3/1991 Nurse
4,999,995 A 3/1991 Nurse
5,079,909 A 1/1992 Bruckner et al.
5,117,635 A 6/1992 Blau
5,175,995 A 1/1993 Pak et al.
5,218,815 A 6/1993 Korenberg
5,247,791 A 9/1993 Pak et al.

(Continued)

OTHER PUBLICATIONS

Mather & Franck, Phase Equilibria in the System Carbon Dioxide–Water at Elevated Pressures, The J. of Phys. Chem., vol. 96, No. 1, 1992, pp. 6–8.

*Primary Examiner*—Hoang Nguyen
(74) *Attorney, Agent, or Firm*—Speed & Rogers, P.A.

(57) ABSTRACT

An elevated pressure power plant (100) for cleanly and efficiently oxidizing, gasifying or combusting a fuel. The fuel is oxidized or gasified in a reaction chamber (210) at a pressure range from approximately 700 psia to 2000 psia, or from approximately 850 psia to 1276 psia. Products of combustion from the chamber may be passed to a heat exchanger (224). A portion of the condensed water may be recycled to the products of combustion upstream of the heat exchanger. Also, before being passed to the reaction chamber, the coolant may be routed through the heat exchanger in a two-step pressure fashion.

4 Claims, 12 Drawing Sheets

U.S. PATENT DOCUMENTS

| | | |
|---|---|---|
| 5,265,410 A | 11/1993 | Hisatome |
| 5,339,633 A | 8/1994 | Fujii et al. |
| 5,345,756 A | 9/1994 | Jahnke et al. |
| 5,491,968 A | 2/1996 | Shouman |
| 5,590,519 A | 1/1997 | Almlof et al. |
| 5,669,220 A | 9/1997 | Rachid |
| 5,724,805 A | 3/1998 | Golomb et al. |
| 5,802,840 A | 9/1998 | Wolf |
| 5,906,806 A | 5/1999 | Clark |
| 5,964,085 A | 10/1999 | Newby |
| 6,196,000 B1 * | 3/2001 | Fassbender .......... 60/649 |

* cited by examiner

| Stream No. | Stream Description | Conditions Temp. °F | Pres. psia | Temp. K | Mass Rate t/hr | Enthalpy Flow Mwatts |
|---|---|---|---|---|---|---|
| 101 | Pressurized Liquid | (298) | 1275 | 90 | 173 | |
| 102 | Pressurized O2 | (10) | 1276 | 250 | 173 | 18 |
| 103 | Pressurized O2 | 44 | 1276 | 280 | 173 | 19 |
| 104 | Liquid CO2 | 74 | 905 | 297 | 233 | - |
| 105 | Pressurized Liquid CO2 | 74 | 1276 | 297 | 233 | - |
| 106 | Pressurized Gaseous CO2 | 107 | 1276 | 315 | 233 | |
| 107 | Pressurized CO2 and O2 Mix | 89 | 1276 | 305 | 407 | 21 |
| 108 | Methane from Pipeline | 68 | 1045 | 293 | 85 | 770 |
| 109 | Pressurized Methane | 134 | 1276 | 330 | 85 | 18 |
| 110 | Pressurized Preheated Methane | 350 | 1276 | 450 | 85 | 29 |
| 111 | Hot Reactor Effluent (Products of Combustion) | 1,160 | 1276 | 900 | 662 | 1,649 |
| 112 | SCR Chemicals | 1,160 | 1276 | 298 | negligible | - |
| 113 | Hot Reactor Effluent after Catalyst | 1,160 | 1276 | 900 | 662 | 336 |
| 114 | Reactor Effluent after Mixing Tee | 566 | 1276 | 570 | 897 | 397 |
| 115 | Reactor Effluent after 224 | 395 | 1276 | 475 | 897 | 182 |
| 116 | Reactor Effluent from 234 to 214 | 395 | 1276 | 475 | 469 | 83 |
| 117 | Water from 234 | 395 | 1276 | 475 | 428 | 99 |
| 118 | Produced Water to Heat Exchanger | 395 | 1276 | 475 | 181 | 42 |
| 119 | Reactor Effluent to 236 | 260 | 1276 | 400 | 469 | 72 |
| 120 | Recycle Water before Mixing Tee | 395 | 1276 | 475 | 258 | 59 |
| 121 | Unpressurized Chemical Additives | 76 | 15 | 298 | negligible | - |
| 122 | Pressurized Chemical Additives | 121 | 1276 | 323 | negligible | - |
| 123 | Recycle Water after additive Mixing Tee | 395 | 1276 | 475 | 258 | 61 |
| 124 | Produced Water after Heat Exchanger | 170 | 1276 | 350 | 181 | 12 |
| 125 | Produced Water after Cooler | 116 | 1276 | 320 | 181 | 5 |
| 126 | Depressurized Produced Water | 116 | 15 | 320 | 181 | 5 |
| 127 | Reactor Effluent after 236 | 130 | 1276 | 327.83 | 469 | 53 |
| 128 | Condensate from KnockOut 244 | 130 | 1276 | 328 | 21 | 1 |
| 129 | Reactor Effluent after KO 244 | 130 | 1276 | 328 | 449 | 52 |
| 130 | Reactor Effluent after 246 | 80 | 1276 | 300 | 449 | 50 |
| 131 | Pressurized Non Condensables | 80 | 15 | 300 | 12 | 2 |
| 132 | Recovered CO2 to Pump 254 | 80 | 1,276 | 300 | 436 | 0 |
| 133 | Pressurized Condensate Blowdown | 80 | 1,276 | 300 | 1 | 0 |
| 134 | Recovered CO2 after P 254 | 80 | 1,276 | 300 | 435 | - |
| 135 | Non Condensables to Vent | 80 | 15 | 300 | 9 | 1 |
| 136 | Liquid CO2 after HX 208 | 74 | 1276 | 297 | 435 | - |
| 137 | Liq. CO2 to Transport | 74 | 1276 | 297 | 202 | - |
| 138 | Liquid CO2 to Storage 252 | 74 | 1276 | 297 | 233 | - |
| 139 | Boiler Feed Water to Pump 218 | 80 | 15 | 300 | 1,854 | (11) |
| 140 | Pres. Boiler Feed Water after 218 | 80 | 600 | 300 | 1,854 | (11) |
| 141 | Pres. Boiler Feed Water after 220 | 139 | 600 | 333 | 1,854 | 76 |
| 142 | Pres. Boiler Feed Water after 222 | 160 | 600 | 345 | 1,854 | 106 |
| 143 | Pres. Boiler Feed after 224 | 326 | 600 | 437 | 1,854 | 349 |
| 144 | Pres. Boiler Feed after 226 | 326 | 4,500 | 437 | 1,854 | 349 |
| 145 | High Pressure Steam to 228 | 1,058 | 4,500 | 843 | 1,854 | 1,695 |
| 146 | Steam after 228 | 175 | 1.2 | 353 | 1,854 | 1,344 |
| 147 | Steam after 220 before 230 | 125 | 1.2 | 325 | 1,854 | |
| 148 | Boiler Feed Water after 230 | 86 | 1.1 | 303 | 1,854 | 65 |
| 149 | Cooling Water to Condenser 230 | 67 | 15 | 293 | 56,166 | 1,310 |
| 150 | Cooling Water from Condenser 230 | 103 | 15 | 313 | 56,166 | 2,614 |
| 151 | Cooling Water to Condenser 240 | 67 | 15 | 293 | 320 | 7 |
| 152 | Cooling Water from Condenser 240 | 85 | 15 | 303 | 320 | 11 |
| 153 | Cooling Water to Condenser 246 | 67 | 15 | 293 | 7,399 | 172 |
| 154 | Cooling Water from Condenser 246 | 78 | 15 | 299 | 7,399 | 224 |
| 155 | O2 Plant Stream to 202 | | | | | |
| 156 | O2 Plant Stream from 202 | | | | | |

FIG. 2

| Stream No. | Stream Description | Mass Flow Methane | CO2 Liquid | CO2 Gas | Gaseous H2O | Liquid H2O | LOX or O2 |
|---|---|---|---|---|---|---|---|
| | | t/hr | t/hr | t/hr | t/hr | t/hr | t/hr |
| 101 | Pressurized Liquid | | | | | | 173.1 |
| 102 | Pressurized O2 | | | | | | 173.1 |
| 103 | Pressurized O2 | | | | | | 173.1 |
| 104 | Liquid CO2 | | 233 | | | | |
| 105 | Pressurized Liquid CO2 | | 233 | | | | |
| 106 | Pressurized Gaseous CO2 | | | 233 | | | |
| 107 | Pressurized CO2 and O2 Mix | | | 233 | | | 173.1 |
| 108 | Methane from Pipeline | 85.1 | | | | | |
| 109 | Pressurized Methane | 85.1 | | | | | |
| 110 | Pressurized Preheated Methane | 85.1 | | | | | |
| 111 | Hot Reactor Effluent (Products of Combustion) | | | 467 | 191.5 | | 3.4 |
| 112 | SCR Chemicals | | | | negligible | | |
| 113 | Hot Reactor Effluent after Catalyst | | | 467 | 191.5 | | 3.4 |
| 114 | Reactor Effluent after Mixing Tee | | | 467 | 369.3 | 56.9 | 3.4 |
| 115 | Reactor Effluent after 224 | | 20.8 | 447 | 19.1 | 407.0 | 3.4 |
| 116 | Reactor Effluent from 234 to 214 | | | 447 | 19.1 | | 3.4 |
| 117 | Water from 234 | | 20.8 | | | 407.0 | |
| 118 | Produced Water to Heat Exchanger | | 8.8 | | | 172.3 | |
| 119 | Reactor Effluent to 236 | | | 447 | 19.1 | | 3.4 |
| 120 | Recycle Water before Mixing Tee | | 12.5 | | | 245 | |
| 121 | Unpressurized Chemical Additives | | | | negligible | | |
| 122 | Pressurized Chemical Additives | | | | negligible | | |
| 123 | Recycle Water after additive Mixing Tee | | - | 12.5 | | 245 | |
| 124 | Produced Water after Heat Exchanger | | - | 8.8 | | 172.3 | |
| 125 | Produced Water after Cooler | | - | 8.8 | | 172.3 | |
| 126 | Depressurized Produced Water | | - | 8.8 | | 172.3 | |
| 127 | Reactor Effluent after 236 | | | 447 | | 19.1 | 3.4 |
| 128 | Condensate from KnockOut 244 | | | 2 | | 19.1 | |
| 129 | Reactor Effluent after KO 244 | | | 445 | 0.7 | | 3.4 |
| 130 | Reactor Effluent after 246 | | 445 | | | 0.7 | 3.4 |
| 131 | Pressurized Non Condensables | | | 8.9 | | | 3.4 |
| 132 | Recovered CO2 to Pump 254 | | 436 | | 0.7 | | |
| 133 | Pressurized Condensate Blowdown | | 0.7 | | | 0.7 | |
| 134 | Recovered CO2 after P 254 | | 435 | | - | | |
| 135 | Non Condensables to Vent | | | 8.9 | | | |
| 136 | Liquid CO2 after HX 208 | | 435 | | | | |
| 137 | Liq. CO2 to Transport | | 202 | | | | |
| 138 | Liquid CO2 to Storage 252 | | 233 | | | | |
| 139 | Boiler Feed Water to Pump 218 | | | | | 1854.104 | |
| 140 | Pres. Boiler Feed Water after 218 | | | | | 1854.104 | |
| 141 | Pres. Boiler Feed Water after 220 | | | | | 1854.104 | |
| 142 | Pres. Boiler Feed Water after 222 | | | | | 1854.104 | |
| 143 | Pres. Boiler Feed after 224 | | | | | 1854.104 | |
| 144 | Pres. Boiler Feed after 226 | | | | | 1854.104 | |
| 145 | High Pressure Steam to 228 | | | | 1854.104 | | |
| 146 | Steam after 228 | | | | 1854.104 | | |
| 147 | Steam after 220 before 230 | | | | 1854.104 | | |
| 148 | Boiler Feed Water after 230 | | | | | 1854.104 | |
| 149 | Cooling Water to Condenser 230 | | | | | 56,166 | |
| 150 | Cooling Water from Condenser 230 | | | | | 56,166 | |
| 151 | Cooling Water to Condenser 240 | | | | | 320 | |
| 152 | Cooling Water from Condenser 240 | | | | | 320 | |
| 153 | Cooling Water to Condenser 246 | | | | | 7,399 | |
| 154 | Cooling Water from Condenser 246 | | | | | 7,399 | |
| 155 | O2 Plant Stream to 202 | | | | | | |
| 156 | O2 Plant Stream from 202 | | | | | | |

FIG. 3

| Stream No. | Stream Description | Energy Flows Methane Sensible MJ/hr | Methane HHV MJ/hr | CO2 Gas MJ/hr | Steam/vap H2O MJ/hr | Liquid H2O MJ/hr | LOX or O2 MJ/hr | Total Energy MJ/hr |
|---|---|---|---|---|---|---|---|---|
| 101 | Pressurized Liquid | | | | | | | |
| 102 | Pressurized O2 | | | | | | 64,560 | 64,560 |
| 103 | Pressurized O2 | | | | | | 69,692 | 69,692 |
| 104 | Liquid CO2 | | | | | | | - |
| 105 | Pressurized Liquid CO2 | | | | | | | - |
| 106 | Pressurized Gaseous CO2 | | | 95,377 | | | | 95,377 |
| 107 | Pressurized CO2 and O2 Mix | | | | | | 73,972 | 73,972 |
| 108 | Methane from Pipeline | 54,677 | | | | | - | 54,677 |
| 109 | Pressurized Methane | 65,306 | | | | | - | 65,306 |
| 110 | Pressurized Preheated Methane | 105,044 | | | | | - | 105,044 |
| 111 | Hot Reactor Effluent (Products of Combustion) | | 4,725,644 | 497,558 | 708,812 | - | 3,470 | 5,935,484 |
| 112 | SCR Chemicals | | | | | | - | |
| 113 | Hot Reactor Effluent after Catalyst | | | 497,558 | 708,812 | - | 3,470 | 1,209,839 |
| 114 | Reactor Effluent after Mixing Tee | | | 311,608 | 1,038,502 | 77,133 | 2,345 | 1,429,587 |
| 115 | Reactor Effluent after 224 | | | 248,409 | 48,480 | 354,644 | 2,023 | 653,556 |
| 116 | Reactor Effluent from 234 to 214 | | | 248,409 | 48,480 | - | 2,023 | 298,912 |
| 117 | Water from 234 | | | - | - | 354,644 | - | 354,644 |
| 118 | Produced Water to Heat Exchanger | | | - | - | 150,155 | - | 150,155 |
| 119 | Reactor Effluent to 236 | | | 213,236 | 44,167 | - | 1,770 | 259,174 |
| 120 | Recycle Water before Mixing Tee | | | - | - | 213,519 | - | 213,519 |
| 121 | Unpressurized Chemical Additives | | | | | | - | |
| 122 | Pressurized Chemical Additives | | | | | | - | |
| 123 | Recycle Water after additive Mixing Tee | | | 6,977 | - | 213,519 | - | 220,496 |
| 124 | Produced Water after Heat Exchanger | | | 3,821 | - | 40,320 | - | 44,141 |
| 125 | Produced Water after Cooler | | | 3,632 | - | 13,960 | - | 17,592 |
| 126 | Depressurized Produced Water | | | 3,998 | - | 13,960 | - | 17,958 |
| 127 | Reactor Effluent after 236 | | | 186,155 | - | 2,315 | 1,527 | 189,998 |
| 128 | Condensate from KnockOut 244 | | | 798 | - | 2,315 | - | 3,113 |
| 129 | Reactor Effluent after KO 244 | | | 185,357 | 1,366 | - | 1,527 | 188,251 |
| 130 | Reactor Effluent after 246 | | | 178,057 | 1,315 | (14) | 1,434 | 180,792 |
| 131 | Pressurized Non Condensables | | | 3,953 | - | - | 1,634 | 5,587 |
| 132 | Recovered CO2 to Pump 254 | | | - | 1,315 | - | - | 1,315 |
| 133 | Pressurized Condensate Blowdown | | | - | 1,315 | (14) | - | 1,301 |
| 134 | Recovered CO2 after P 254 | | | - | - | - | - | - |
| 135 | Non Condensables to Vent | | | 3,953 | - | - | - | 3,953 |
| 136 | Liquid CO2 after HX 208 | | | - | - | - | - | - |
| 137 | Liq. CO2 to Transport | | | - | - | - | - | - |
| 138 | Liquid CO2 to Storage 252 | | | - | - | - | - | - |
| 139 | Boiler Feed Water to Pump 218 | | | - | - | (38,881) | - | (38,881) |
| 140 | Pres. Boiler Feed Water after 218 | | | - | - | (38,881) | - | (38,881) |

FIG.4A

| 141 | Pres. Boiler Feed Water after 220 | | | - | - | 273,110 | - | 273,110 |
|---|---|---|---|---|---|---|---|---|
| 142 | Pres. Boiler Feed Water after 222 | | | - | - | 382,944 | - | 382,944 |
| 143 | Pres. Boiler Feed after 224 | | | - | - | 1,255,047 | - | 1,255,047 |
| 144 | Pres. Boiler Feed after 226 | | | - | - | 1,255,047 | - | 1,255,047 |
| 145 | High Pressure Steam to 228 | | | - | 6,103,470 | - | - | 6,103,470 |
| 146 | Steam after 228 | | | - | 4,838,852 | - | - | 4,838,852 |
| 147 | Steam after 220 before 230 | | | - | 4,747,887 | - | - | 4,747,887 |
| 148 | Boiler Feed Water after 230 | | | - | - | 233,617 | - | 233,617 |
| 149 | Cooling Water to Condenser 230 | | | - | - | 4,715,131 | - | 4,715,131 |
| 150 | Cooling Water from Condenser 230 | | | - | - | 9,411,166 | | 9,411,166 |
| 151 | Cooling Water to Condenser 240 | | | - | - | 26,854 | | 26,854 |
| 152 | Cooling Water from Condenser 240 | | | - | - | 40,249 | | 40,249 |
| 153 | Cooling Water to Condenser 246 | | | - | - | 620,618 | | 620,618 |
| 154 | Cooling Water from Condenser 246 | | | - | - | 806,249 | | 806,249 |
| 155 | O2 Plant Stream to 202 | | | | | | | - |
| 156 | O2 Plant Stream from 202 | | | | | | | - |

FIG. 4B

| Stream No. | Stream Description | Conditions | | | Mass Rate | Thermal Power |
|---|---|---|---|---|---|---|
| | | Temp. °F | Pres. psia | Temp. K | t/hr | Mwatts |
| 301 | Pulverized Coal | 80 | 1276 | 300 | 38.3 | 347 |
| 302 | Mix of Liquid CO2 and Pulverized Coal | 62 | 1276 | 290 | 76.7 | 3 |
| 303 | Liquid CO2 | 62 | 771 | 290 | 184 | (2) |
| 304 | Pressurized Liquid CO2 | 62 | 1276 | 290 | 38.3 | (1) |
| 305 | Pressurized O2 | (28) | 1276 | 240 | 112 | 11 |
| 306 | Pressurized O2 | 84 | 1276 | 302 | 112 | 13 |
| 307 | Pressurized Mix of CO2 and Coal | 84 | 1276 | 302 | 76.7 | 0 |
| 308 | Pressurized Liquid CO2 | 84 | 1276 | 302 | 146 | 1 |
| 309 | Preheated Pressurized Gaseous CO2 | 80 | 1276 | 300 | 146 | 16 |
| 310 | Mix of O2 and CO2 | 62 | 1276 | 290 | 257 | 29 |
| 311 | Hot Reactor Effluent (Products of Combustion) | 1016 | 1276 | 820 | 334 | 456 |
| 312 | Reactor Effluent after Mixing Tee | 566 | 1276 | 570 | 644 | 219 |
| 313 | Reactor Effluent after Interchanger 424 | 440 | 1276 | 500 | 644 | 112 |
| 314 | Water and Ash from KO Drum 436 | 440 | 1276 | 500 | 240 | 62 |
| 315 | Produced Water from Hydroclone 438 | 440 | 1276 | 500 | 210 | 55 |
| 316 | Water and Ash to Cooler 450 | 440 | 1276 | 500 | 29.4 | 118 |
| 317 | Water & Ash from Cooler 450 | 116 | 1276 | 320 | 29.4 | 115 |
| 318 | Water & Ash Effluent | 116 | 1276 | 320 | 32.3 | 356 |
| 319 | pH Adjustment Chemicals | 67 | 1276 | 293 | 0.1 | 0 |
| 320 | Produced Water and Additives | 440 | 1276 | 500 | 210 | 110 |
| 321 | Boiler Feed Water | 80 | 15 | 300 | 468 | 18 |
| 322 | Pressurized Boiler Feed Water | 80 | 600 | 300 | 468 | 9 |
| 323 | Pres. Feed Water after Interchanger 424 | 404 | 600 | 480 | 468 | 117 |
| 324 | Pres. Boiler Feed Water after Pump 430 | 404 | 3500 | 480 | 468 | 116 |
| 325 | High Pressure Steam | 980 | 3500 | 800 | 468 | 419 |
| 326 | Steam after Turbine 432 | 122 | 2.2 | 323 | 468 | 332 |
| 327 | Boiler Feed Water after Condenser 434 | 122 | 2.2 | 323 | 468 | 23 |
| 328 | Gas Stream from KO drum 436 | 440 | 1276 | 500 | 306 | 51 |
| 329 | Gas Stream after Catalyst 456 | 440 | 1276 | 500 | 306 | 51 |
| 330 | Gas Stream after Exchanger 416 | 94 | 1276 | 308 | 306 | 36 |
| 331 | Gas Stream from KO Drum 458 | 94 | 1276 | 308 | 302 | 34 |
| 332 | Water & Acid from KO Drum 458 | 94 | 1276 | 308 | 3.8 | 2 |
| 333 | Condensed CO2 and Gases | 80 | 1276 | 300 | 302 | 4 |
| 334 | Water & Acid from Flash Cooler 444 | 80 | 1276 | 300 | 0.1 | 0 |
| 335 | Combined Water & Acid Stream | 170 | 1276 | 350 | 3.9 | 2 |
| 336 | Liquid CO2 to Heat Exchanger 422 | 80 | 1276 | 300 | 265 | 0 |
| 337 | Vent of Non condensables | 80 | 15 | 300 | 36.9 | 5 |
| 338 | Liquid CO2 after Heat Exchanger 422 | 62 | 1276 | 290 | 265 | (4) |
| 339 | Liquid CO2 from Pump 446 | 80 | 1276 | 300 | 265 | 0 |
| 340 | Liquid CO2 to Transport 448 | 62 | 1276 | 290 | 80.5 | (1) |
| 341 | Liquid CO2 to Storage 412 | 62 | 1276 | 290 | 184 | 20 |
| 342 | Cooling Water to Condenser 434 | 76 | 15 | 298 | 16,112 | 277 |
| 343 | Cooling Water from Condenser 434 | 103 | 15 | 313 | 16,112 | 586 |
| 344 | Cooling Water to Condenser 442 | 76 | 15 | 298 | 1,538 | 26 |
| 345 | Cooling Water from Condenser 442 | 103 | 15 | 313 | 1,538 | 56 |
| 346 | Cooling Water to Produced Water Cooler 450 | 76 | 15 | 298 | 109 | 2 |
| 347 | Cooling Water from Produced Water Cooler 450 | 116 | 15 | 320 | 109 | 5 |

FIG. 6

| Stream No. | Stream Description | Coal | CO2 Liq | CO2 Gas | CO2 Total | H2O Liq | H2O Gas | H2O Total | SO2 SO3 | Ash | Oxidant Feed |
|---|---|---|---|---|---|---|---|---|---|---|---|
| | | Mass Flow | | | | | | | | | |
| | | t/hr | t/hr | t/hr | t/hr | t/hr | t/hr | t/hr | t/hr | t/hr | t/hr |
| 301 | Pulverized Coal | 38.3 | | | | | | | | | |
| 302 | Mix of Liquid CO2 and Pulverized Coal | 38.3 | 38.3 | | 38.3 | | | | | | |
| 303 | Liquid CO2 | | 184 | | 184 | | | | | | |
| 304 | Pressurized Liquid CO2 | | 38.3 | | 38.3 | | | | | | |
| 305 | Pressurized O2 | | | | | | | | | | 112 |
| 306 | Pressurized O2 | | | | | | | | | | 112 |
| 307 | Pressurized Mix of CO2 and Coal | 38.3 | 38.3 | | 38.3 | | | | | | |
| 308 | Pressurized Liquid CO2 | | 146 | | 146 | | | | | | |
| 309 | Preheated Pressurized Gaseous CO2 | | | 146 | 146 | | | | | | |
| 310 | Mix of O2 and CO2 | | | 146 | 146 | | | | | | 112 |
| 311 | Hot Reactor Effluent | | | 295 | 295 | | 27.4 | 27.4 | 0.74 | 2.7 | 7.7 |
| 312 | Reactor Effluent after Mixing Tee | | 9.8 | 295 | 305 | 37 | 191.3 | 228 | 0.74 | 2.7 | 7.7 |
| 313 | Reactor Effluent after | | 11.1 | 294 | 305 | 225 | 2.94 | 228 | 0.74 | 2.7 | 7.7 |
| 314 | Water and Ash from KO Drum 436 | | 11.1 | | 11.1 | 225 | | 225 | 0.74 | 2.7 | |
| 315 | Produced Water from Hydroclone 438 | | 9.8 | | 9.8 | 200 | | 200 | | | |
| 316 | Water and Ash to Cooler 450 | | 1.34 | | 1.34 | 25 | | 25 | 0.74 | 2.7 | |
| 317 | Water & Ash from Cooler 450 | | 1.34 | | 1.34 | 25 | | 25 | 0.74 | 2.7 | |
| 318 | Water & Ash Effluent | | 1.34 | | 1.34 | 28 | | 28 | 0.74 | 2.7 | |
| 319 | pH Adjustment Chemicals | | | | | 0.10 | | 0.10 | | | |
| 320 | Produced Water and Additives | | 9.8 | | 9.8 | 201 | | 201 | | | |
| 321 | Boiler Feed Water | | | | | 468 | | 468 | | | |
| 322 | Pressurized Boiler Feed Water | | | | | 468 | | 468 | | | |
| 323 | Pres. Feed Water after 424 | | | | | 468 | | 468 | | | |
| 324 | Pres. Boiler Feed Water after 430 | | | | | 468 | | 468 | | | |
| 325 | High Pressure Steam | | | | | | 468 | 468 | | | |
| 326 | Steam after Turbine 432 | | | | | | 468 | 468 | | | |
| 327 | Boiler Feed Water after 434 | | | | | 468 | | 468 | | | |
| 328 | Gas Stream from KO drum 436 | | | 294 | 294 | | 2.94 | 2.94 | 0.74 | | 7.70 |
| 329 | Gas Stream after Catalyst 456 | | | 294 | 294 | | 2.94 | 2.94 | 0.93 | | 7.52 |
| 330 | Gas Stream after Exchanger 416 | | | 294 | 294 | 2.94 | 2.94 | 2.94 | 0.93 | | 7.52 |
| 331 | Gas Stream from KO Drum 458 | | | 294 | 294 | 0.05 | | 0.05 | | | 7.52 |
| 332 | Water & Acid from KO Drum 458 | | | | | 2.89 | | 2.89 | 0.93 | | |
| 333 | Condensed CO2 and Gases | | 265 | 29.4 | 294 | | | | | | 7.52 |
| 334 | Water & Acid from Flash Cooler 444 | | | | | 0.05 | | 0.05 | | | |
| 335 | Combined Water & Acid Stream | | | | | 2.94 | | 2.94 | 0.93 | | |
| 336 | Liquid CO2 to Heat Exchanger 422 | | 265 | | 265 | | | | | | |
| 337 | Vent of Non condensables | | | 29 | 29 | | | | | | 7.52 |
| 338 | Liquid CO2 after Heat Exchanger 422 | | 265 | | 265 | | | | | | |
| 339 | Liquid CO2 from Pump 446 | | 265 | | 265 | | | | | | |
| 340 | Liquid CO2 to Transport 448 | | 81 | | 81 | | | | | | |
| 341 | Liquid CO2 to Storage 412 | | | 184 | 184 | | | | | | |
| 342 | Cooling Water to Condenser 434 | | | | | 16,112 | | 16,112 | | | |
| 343 | Cooling Water from Condenser 434 | | | | | 16,112 | | 16,112 | | | |
| 344 | Cooling Water to Condenser 442 | | | | | 1,538 | | 1,538 | | | |
| 345 | Cooling Water from Condenser 442 | | | | | 1,538 | | 1,538 | | | |
| 346 | Cooling Water to Cooler 450 | | | | | 109 | | 109 | | | |
| 347 | Cooling Water from Cooler 450 | | | | | 109 | | 109 | | | |

| Stream No. | Stream Description | Energy Flows Coal Sens MJ/hr | Coal Combust MJ/hr | CO2 Liq MJ/hr | CO2 Gas MJ/hr | H2O Liq MJ/hr | H2O Steam/vap MJ/hr | SO2 MJ/hr | Ash MJ/hr | Oxidant MJ/hr | Total Energy MJ/hr |
|---|---|---|---|---|---|---|---|---|---|---|---|
| 301 | Pulverized Coal | 14,449 | | | | | | | | | 14,449 |
| 302 | Mix of Liquid CO2 and Pulverized Coal | 13,967 | | (1867) | | | | | | | 12,100 |
| 303 | Liquid CO2 | | | (8968) | | | | | | | (8,968) |
| 304 | Pressurized Liquid CO2 | | | (1867) | | | | | | | (1,867) |
| 305 | Pressurized O2 | | | | | | | | | 40,529 | 40,529 |
| 306 | Pressurized O2 | | | | | | | | | 47,369 | 47,369 |
| 307 | Pressurized Mix of CO2 and Coal | | | 657 | | | | | | | 657 |
| 308 | Pressurized Liquid CO2 | | | 2,499 | | | | | | | 2,499 |
| 309 | Preheated Pressurized Gaseous CO2 | | | | 58,397 | | | | | | 58,397 |
| 310 | Mix of O2 and CO2 | | | | 57,734 | | | | | 46,044 | 103,778 |
| 311 | Hot Reactor Effluent | | 1,248,837 | | 286,409 | | 95,994 | 504 | 2,023 | 7,252 | 1,641,019 |
| 312 | Reactor Effluent after Mixing Tee | | | | 196,975 | 48,108 | 538,125 | | 1,406 | 5,321 | 789,932 |
| 313 | Reactor Effluent after Mixing Tee | | | | 171,921 | 223,169 | 2,917 | 269 | | 4,783 | 403,058 |
| 314 | Water and Ash from KO Drum 436 | | | | | 223,169 | | 239 | 1,233 | | 224,671 |
| 315 | Produced Water from Hydroclone 438 | | | | | 198,776 | | | | | 198,776 |
| 316 | Water and Ash to Cooler 450 | | | | | 24,383 | | | 401,671 | | 426,333 |
| 317 | Water & Ash from Cooler 450 | | | | | 4,014 | | 269 | 411,096 | | 415,260 |
| 318 | Water & Ash Effluent | | | | | 4,494 | | 150 | 1,276,701 | | 1,281,346 |
| 319 | pH Adjustment Chemicals | | | | | 4 | | | | | 4 |
| 320 | Produced Water and Additives | | | | | 198,875 | 198,876 | | | | 397,750 |
| 321 | Boiler Feed Water | | | | | 33,265 | 33,265 | | | | 66,530 |
| 322 | Pressurized Boiler Feed Water | | | | | 33,265 | | | | | 33,265 |
| 323 | Pres. Feed Water after 424 | | | | | 420,139 | | | | | 420,139 |
| 324 | Pres. Boiler Feed Water after 430 | | | | | 418,719 | | | | | 418,719 |
| 325 | High Pressure Steam | | | | | | 1,509,712 | | | | 1,509,712 |
| 326 | Steam after Turbine 432 | | | | | | 1,195,630 | | | | 1,195,630 |
| 327 | Boiler Feed Water after 434 | | | | | 83,091 | | | | | 83,091 |
| 328 | Gas Stream from KO drum 436 | | | | 171,921 | | 7,666 | 269 | | 4,783 | 184,639 |
| 329 | Gas Stream after Catalyst 456 | | | | 171,921 | | 7,668 | 337 | | 4,667 | 184,591 |
| 330 | Gas Stream after Exchanger 416 | | | | 119,007 | | 5,990 | 179 | | 3,234 | 128,728 |
| 331 | Gas Stream from KO Drum 458 | | | | 119,007 | 5 | | | | 3,234 | 122,247 |
| 332 | Water & Acid from KO Drum 458 | | | | | 312 | 5,888 | 179 | | | 6,379 |
| 333 | Condensed CO2 and Gases | | | 1,119 | 11,778 | | | | | | 16,071 |
| 334 | Water & Acid from Flash Cooler 444 | | | | | 4 | 101 | | | | 104 |
| 335 | Combined Water & Acid Stream | | | | | 856 | 6,346 | 211 | | | 7,444 |
| 336 | Liquid CO2 to Heat Exchanger 422 | | | 1,119 | | | | | | | 1,119 |
| 337 | Vent of Non condensables | | | | 13,075 | | | | | 3,618 | 16,693 |
| 338 | Liquid CO2 after Heat Exchanger 422 | | | (12,869) | | | | | | | (12,869) |
| 339 | Liquid CO2 from Pump 446 | | | 1,119 | | | | | | | 1,119 |
| 340 | Liquid CO2 to Transport 448 | | | (3,921) | | | | | | | (3,921) |
| 341 | Liquid CO2 to Storage 412 | | | | 72,914 | | | | | | 72,914 |
| 342 | Cooling Water to Condenser 434 | | | | | 997,995 | | | | | 997,995 |
| 343 | Cooling Water from Condenser 434 | | | | | 2,110,534 | | | | | 2,110,534 |
| 344 | Cooling Water to Condenser 442 | | | | | 95,244 | | | | | 95,224 |
| 345 | Cooling Water from Condenser 442 | | | | | 201,420 | | | | | 201,420 |
| 346 | Cooling Water to Cooler 450 | | | | | 6,772 | | | | | 6,772 |
| 347 | Cooling Water from Cooler 450 | | | | | 17,845 | | | | | 17,845 |

POWER SYSTEM WITH ENHANCED THERMODYNAMIC EFFICIENCY AND POLLUTION CONTROL

This application is a national phase application based upon PCT Application Ser. No. PCT/US01/01011, filed on Jan. 11, 2001, which is a continuation-in-part of utility patent application 09/483,677 filed Jan. 14, 2000, which issued on Mar. 6, 2001 as U.S. Pat. No. 6,196,000.

BACKGROUND OF THE INVENTION

This invention relates to a power plant or system, and more particularly, to a low-emission, fossil fuel power plant with enhanced thermodynamic efficiency and pollution control.

In power plants, such as fossil fuel power plants, a fossil fuel is ignited and burned, oxidized or combusted within a reaction or combustion chamber under controlled conditions to generate heat. The heat is transferred to a circulating fluid, such as water, which flows through cooling tubes found in or adjacent to the reaction chamber, to generate steam. The steam is then passed through a steam turbine to generate electricity. Integrated Gasification Combined Cycle (IGCC) power plants using solid fuels split the fossil fuel combustion process into multiple stages where the first stage is typically a partial oxidation or gasification step. Subsequent stages combust the produced gas in gas turbines and steam boilers. Thermodynamic efficiency and pollution control have been and remain important considerations in the design of fossil fuel power plants. Conservation concerns, increasing fuel prices, and increasingly stringent pollution control standards are just a few of the factors that are requiring better, cleaner, more efficient ways of converting fossil fuels to electricity. Power plants or systems have achieved relatively high levels of efficiency and pollution control, but they are not without problems. For example, as effluent particulate standards have become increasingly difficult to meet, power plants have typically required a number of different processes and pieces of equipment to remove particulate matter. This adds to the cost and complexity of the system, and these processes and pieces of equipment typically require substantial power input, leading to substantial parasitic power losses and inefficiencies. Further, although power plants have occasionally used economizers and similar equipment to recover a portion of the sensible heat from the gases in the products of combustion, power plants have not attempted to recover the latent heat of vaporization of such gases because, under operating conditions of such plants, the condensation temperatures of such gases are too low to be efficiently recovered. Particularly in a system in which a relatively large amount of gaseous water is produced during combustion, the failure to recover any significant portion of such latent heat of vaporization can lead to significant thermodynamic inefficiencies.

SUMMARY OF THE INVENTION

It is therefore an object of the present invention to provide an integrated power plant or system that recovers the latent heat of vaporization from produced water, scrubs out acid gases, removes chemical pollutants such as mercury and particulates, and condenses and recovers liquid carbon dioxide as an integral part of an over-all process.

It is a further object of the present invention to provide a power plant or system offering enhanced thermodynamic efficiency.

It is a further object of the present invention to provide a system of the above type that provides for enhanced pollution control.

It is a still further object of the present invention to provide a system of the above type that offers increased flexibility.

It is a still further object of the present invention to provide a system of the above type that allows one to recover at least a portion of the latent heat of vaporization of water produced during oxidation or combustion.

It is a still further object of the present invention to provide a system of the above type that operates at an elevated pressure making it thermodynamically practical to recover at least a portion of the latent heat of vaporization of water produced during oxidation or combustion.

It is a still further object of the present invention to provide a system of the above type that takes advantage of the useful properties of carbon dioxide.

It is a still further object of the present invention to provide a system of the above type that uses recycled, recovered water produced during oxidation or combustion to provide for reduced equipment costs and reduced equipment wear.

It is a still further object of the present invention to provide a system of the above type that uses a two-stage pressure step-up of the coolant to reduce heat exchanger equipment costs and reduce heat exchanger wear.

It is a still further object of the present invention to provide a system of the above type that provides for the efficient recovery of carbon dioxide for later use or sale.

It is a still further object of the present invention to provide a system of the above type that provides for improved removal of particulate matter from products of oxidation or combustion.

It is a still further object of the present invention to provide a system of the above type that provides for the efficient partial oxidation or gasification of solid and liquid fossil fuels.

Toward the fulfillment of these and other objects and advantages, an elevated pressure power plant or system is disclosed that provides for cleanly and efficiently oxidizing or combusting a fuel, such as a fossil fuel, as follows. The fuel and an oxidant are passed to a reaction chamber, and the fuel is oxidized in the chamber at a pressure that is preferably substantially within a range of from approximately 700 psia to approximately 2000 psia and that is more preferably substantially within a range of from approximately 850 psia to approximately 1276 psia. A coolant is passed to the reaction chamber in a heat exchange relationship with the fuel and oxidant. The pressure of the reaction chamber is selected so that it is greater than or equal to a liquid-vapor equilibrium pressure of carbon dioxide at the temperature at which the power plant can reject heat to the environment. Products of combustion from the chamber may be passed to a heat exchanger, and water may be condensed from the products of combustion in the heat exchanger at a pressure that is preferably substantially within a range of from approximately 700 psia to approximately 2000 psia and that is more preferably substantially within a range of from approximately 850 psia to approximately 1276 psia. A portion of the condensed water may be recycled to the products of combustion upstream of the heat exchanger. Also, before being passed to the reaction chamber, the coolant may be routed through the heat exchanger in a two-step pressure fashion so that the coolant passes to the heat exchanger at a pressure substantially within a range of from approximately 300 psia to approximately 600 psia and passes to the reaction chamber at a pressure substantially within a range of from approximately 2000 psia to approximately 5000 psia.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein:

FIG. 2 is a table showing a preferred, hypothetical set of operating conditions for the system depicted in FIG. 1;

FIG. 3 is a table showing a preferred, hypothetical mass flow of the system depicted in FIG. 1;

FIGS. 4A and 4B are tables showing a preferred, hypothetical energy flow of the system depicted in FIG. 1;

FIG. 6 is a table showing a preferred, hypothetical set of operating conditions for the system depicted in FIG. 5;

FIG. 7 is a table showing a preferred, hypothetical mass flow of the system depicted in FIG. 5;

FIG. 8 is a table showing a preferred, hypothetical energy flow of the system depicted in FIG. 5;

DETAILED DESCRIPTION OF THE PREFERRED EMBODIMENT

Figure 1:
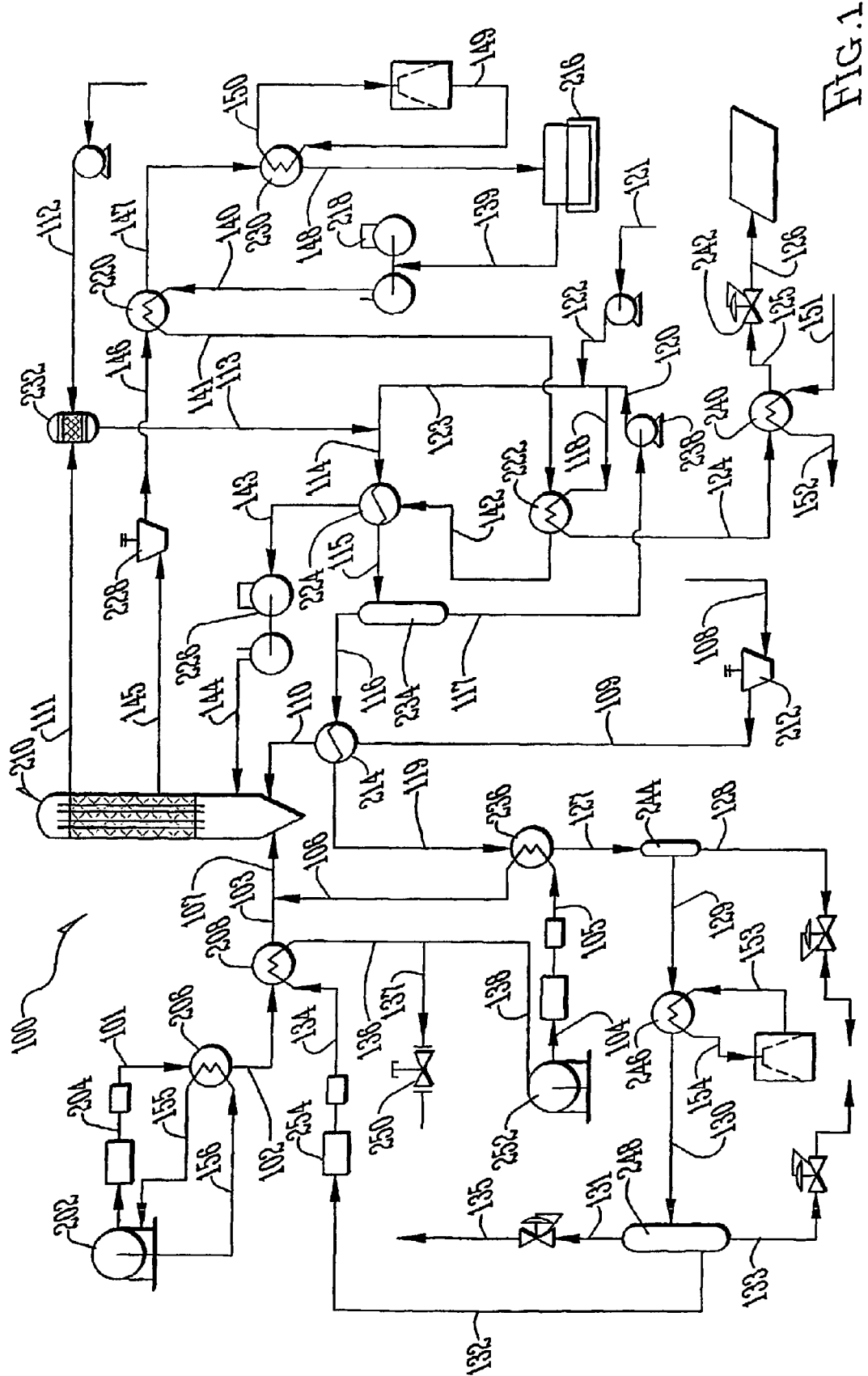
FIG. 1 is a schematic representation of a power system incorporating the present invention for fossil-fuels containing minimal or no ash or ash forming materials.

Referring to FIG. 1, the reference numeral 100 refers in general to an integrated power system of the present invention that integrates the combustion of fossil fuels and the efficient production of electricity with the recovery of liquid carbon dioxide and the elimination of acid gas and particulate emissions. Referring to FIGS. 1 and 2, liquid oxygen from tank 202 is pumped to system pressure by pump 204. For the system depicted in FIG. 1, the system pressure is preferably within a range of from approximately 700 psia to approximately 2000 psia and is more preferably substantially within a range of from approximately 850 psia to approximately 1276 psia. This pressure range allows one to use standard equipment designs and encompasses the critical pressure of carbon dioxide (1,071 psi or 7.382 MPascal). In the later stages of the system, when water and carbon dioxide are sequentially condensed, this elevated system pressure range allows carbon dioxide condensation at the highest possible temperature and water condensation at a useful temperature while optimizing system pressure and minimizing overall capital cost. A useful temperature for produced water condensation is a temperature high enough that standard heat exchangers can readily transfer the heat of vaporization of the produced water to the coolant.

The system-pressure liquid oxygen stream 101 passes through heat exchanger 206 where the oxygen is vaporized and raised to near ambient temperatures. The refrigeration capacity from vaporizing the oxygen is recovered and recirculated to the oxygen plant. The gaseous oxygen in stream 102 is further heated in heat exchanger 208 and then mixed with gaseous carbon dioxide from stream 106. This mixture of oxygen and carbon dioxide in stream 107 is used as the oxidant in the high-pressure reaction or combustion chamber 210. Mixing the carbon dioxide with the oxygen upstream of the reaction chamber offers a number of advantages. For example, it helps control combustion temperatures by reducing the peak concentrations of oxygen in the reaction chamber. Although the oxidant is described above as being a mixture of oxygen and carbon dioxide, it is understood that a wide variety of oxidants may be used. For example, the oxidant may consist of air or preferably air enriched in oxygen, mixtures of oxygen in nitrogen, carbon dioxide or other inert gases or most preferably oxygen from an air separation facility containing greater than 85 volume percent oxygen by composition.

Fuel, such as natural gas from a transmission pipeline 108 is compressed to system pressure at natural gas compressor 212 and sent via stream 109 to heat exchanger 214 where it is pre-heated. The pre-heated gas combines with the oxidant in the high-pressure reaction chamber to generate heat. The heat in the reaction chamber is transferred to a coolant, such as water, in stream 144 that vaporizes into steam by stream 145.

The coolant, such as boiler feed water and steam, circulates through streams 139 through 148. Water is stored at or near ambient temperature and essentially atmospheric pressure in boiler-feed-water tank 216. Ambient temperature in this case being the lowest temperature at which the power plant can routinely reject heat to the environment. Water passes from the boiler water tank 216 to pump 218 at ambient temperature and pressure via stream 139. This stream condition is set at ambient temperature in order to provide the greatest driving force through the steam turbine and thereby generate the most power from this process. Pump 218 pressurizes the water to an intermediate pressure that is preferably substantially within a range of from approximately 300 psia to approximately 600 psia and that is more preferably approximately 600 psia. The use of the intermediate pressure as part of a two-step pressure increase for the coolant provides a number of advantages. For example, the use of the intermediate pressure allows the 1276 psia stream 113 to enter heat exchanger 224 on the tube side and the 300 to 600 psia stream 142 to enter heat exchanger 224 on the shell side. The shell side pressure of heat exchanger 224 at the intermediate pressure of approximately 300–600 psia is much lower than the typical high-pressure steam pressure of 3500 psia. This simplifies the design of heat exchanger 224 and adds to the durability of the system. It is understood that the boiler feed water feed in stream 142 may be passed to the heat exchanger 224 at a wide range of pressures. The pressure is preferably selected so that it is greater than the saturated water pressure at the heat exchanger 224 exit temperature.

Pump 218 passes the water at ambient temperature and the intermediate pressure to economizer 220 via stream 140. From the economizer, the pre-heated water passes via stream 141 to heat exchanger 222 and via stream 142 to heat exchanger 224. The pre-heated boiler feed water at the intermediate pressure passes from heat exchanger 224 to pump 226 in a liquid state via stream 143. Pump 226 raises the pressure of the pre-heated boiler feed water to a pressure that is preferably substantially within a range of from approximately 2000 psia to approximately 5000 psia and that is more preferably approximately 3500 psia. The boiler feed water passes via stream 144 through the reaction chamber in a heat exchange relationship with the combusting fuel so that the combusting fuel gives up its heat of combustion to the water and steam in the boiler tubes. In the preferred embodiment, sufficient heat transfer surface is available so that the products of combustion exit the reaction chamber via stream 111 at approximately 900° K. or 1,160° F. The boiler feed water is converted to steam and passes via stream 145 to a steam turbine 228 for generating electricity before passing via stream 146 to economizer 220 and via stream 147 to condenser 230. Condensed water passes via stream 148 to the boiler water tank 216 for further circulation through streams 139–148.

The products of combustion or oxidation exit the reaction chamber 210 via stream 111 and pass through a catalytic reactor 232. The products of combustion contain carbon dioxide, carbon monoxide, excess oxygen, oxides of sulfur, oxides of nitrogen, diluent gases such as nitrogen and inert gases, produced water in the form of steam, and ash particles when ash forming materials are present. The catalysts in reactor 232 may be selected to achieve specific desired results. Oxidation catalysts can be used to fully oxidize carbon monoxide, oxides of sulfur and oxides of nitrogen into carbon dioxide, sulfur trioxide and nitrogen dioxide respectively. Selective catalytic reduction, or SCR catalysts, can be used with ammonia addition to reduce nitrogen oxides to nitrogen. Different beds of catalysts can be used in combination to achieve the desired effect. Reactants, such as ammonia, are passed to the catalytic reactor 232 via stream 112. The treated gases in stream 113 are mixed with produced water recycle from stream 123 to form stream 114 upstream of heat exchanger 224. The recirculation rate of the produced water stream 123 is selected so that a portion but not all of the water will vaporize and reduce the temperature of stream 114, the combination of recycled produced water and products of combustion, to the saturation temperature of water at the system pressure.

The mixture of recycled produced water and exhaust gases pass via stream 114 through the tube side of heat exchanger 224. Heat exchanger 224 transfers heat from the products of combustion passing through the tube side of heat exchanger 224 via streams 114 and 115 to the coolant passing through the shell side of the heat exchanger via streams 142 and 143. Since stream 114 is at system pressure, the water saturation temperature at this pressure is high enough to allow useful heat transfer and recovery of the latent heat of vaporization of the produced water. The system pressure is selected so that water condenses from the products of combustion at a temperature that is preferably above approximately 450° F. and that is more preferably above 500° F.

In conventional power plants operated at or near atmospheric pressure, the heat of vaporization energy of the water produced in the combustion process cannot be economically recovered because the water saturation temperature or vapor—liquid equilibrium saturation temperature of the water vapor is approximately 200° F.–220° F., which is too low. For example, the boiler feed water would typically have a temperature of about 80° F. and the amount of energy that the boiler feed water could absorb is limited to the enthalpy change between 80° F. and about 212° F. if perfect heat exchange were possible. Practically, perfect heat exchange is not economically possible and a significant thermal driving force is needed to achieve useful heat transfer. This means that the amount of exhaust gas water latent heat energy that could be practically absorbed by the boiler feed water is significantly less than the enthalpy change between 80° F. and about 212° F. At the typical system pressure of conventional systems, water condenses at a low temperature and there is simply an insufficient thermal driving force and an insufficient temperature rise in the coolant fluid for the economic recovery of the heat of vaporization of the produced water.

The subject power system offers other advantages at heat exchanger 224. For example, the use of the produced water recycle via stream 123 reduces the peak temperature experienced by heat exchanger 224 while allowing all or substantially all of the useful heat to be transferred at the water saturation temperature. The heat transfer coefficient of condensing water is typically larger than that of flowing gas. This reduces equipment costs and equipment wear. In addition, as the gaseous water is condensed in heat exchanger 224, acid gases and particles will nucleate condensate droplet formation to provide a scrubbing action. This aspect is particularly useful in similar systems using fuels such as oil or coal because there are typically greater levels of acid gases and particulate matter with these fuels.

In a preferred mode of operation, heat exchanger 224 is designed and operated so that the condensed water in stream 115 is a sub-cooled liquid and so that the carbon dioxide in stream 115 is above the carbon dioxide critical temperature. The vast majority of water in stream 115 is removed by knockout drum or vessel 234 as condensate via stream 117. The concentration of carbon dioxide in the condensed, produced water in stream 117 is approximately 2 mole percent. The gaseous carbon dioxide leaves the knockout drum 234 via stream 116. Stream 116 passes to heat exchanger 214 to preheat the natural gas from stream 109. Gaseous carbon dioxide exits heat exchanger 214 via stream 119 and passes to heat exchanger 236 to vaporize diluent carbon dioxide from stream 105.

The recycled, produced water and the produced water from knockout drum 234 are pumped by pump 238 into stream 120, and stream 120 is split into streams 118 and 123. The water in stream 118 passes through heat exchangers 222 and 240 and then passes through a pressure relief valve 242. The recycled produced water in stream 123 continues on a recycle circuit to be combined with the products of combustion in stream 113, upstream of heat exchanger 224. Stream 122 may be used to provide pH adjustment and other chemicals as needed. Such additive chemicals may be used to treat condensed acids. Upon reaching the acid dew point, the sulfur trioxide, $SO_3$, reacts with water to form sulfuric acid which condenses into the liquid phase. The $NO_2$ may be reacted with a suitable reductant such as formic acid or hydroxylamine to form nitrogen gas according to the hydrothermal reactions:

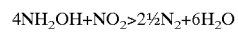

or,

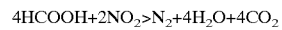

Another potential reaction is the use of oxalic acid and hydroxylamine to convert nitrogen oxides to ammonium nitrate without the subsequent production of nitrogen monoxide:

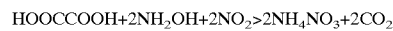

The separation of oxides of sulfur and nitrogen from the bulk gas stream occurs as an intrinsic simultaneous part of the subject system operation. The recovery of the heat of vaporization of the produced water and the condensation of the carbon dioxide create two separate phase change operations which provide ample opportunity and driving force for the conversion and separation of oxides of nitrogen and sulfur.

It is well-known that gaseous particulates 0.1 to 2.5 microns in size will rapidly nucleate condensation of saturated gases. Small suspended particulates reduce the degree of super-saturation needed for condensate nucleation to negligible levels. The subject system has two phase change operations involving the condensation of saturated gases, water and $CO_2$. Therefore, it is anticipated that all particulates, including the smallest sub-micron particulates, will be scrubbed and recovered in the condensed phase.

Heat exchanger 236 continues the cooling process of the carbon dioxide in stream 119. Stream 127 passes from heat exchanger 236 to knockout drum 244 where any dissolved water is separated and blown down as a condensate via stream 128. The gaseous carbon dioxide in stream 129 passes to heat exchanger 246 where it is substantially condensed and liquefied. The condensing carbon dioxide provides yet another beneficial scrubbing effect to further remove particulate matter. The coolant or cooling water in streams 153 and 154 used in heat exchanger 246 may also be used again in condenser 230.

The critical temperature of carbon dioxide is 88° F. (31° C.). Below that temperature, carbon dioxide can be condensed into a liquid. Power plants and most chemical plants reject heat to a heat sink in the natural environment. Often these heat sinks are lakes, rivers or oceans. For example, a plant might draw water from a lake, liver or ocean to provide a cooling fluid for heat exchangers such as 230 and 246. Such water may be withdrawn and returned at high rates so that any temperature rise in the water is small. A heat sink in the natural environment can also be obtained by the evaporation of water with air. In the most preferred embodiment, devices and systems utilizing or comprising the subject invention will reject heat to a heat sink, such as the cooling fluid flowing through lines 153 and 154 of FIG. 1, at a temperature below the critical point of carbon dioxide. Said heat sink with a temperature below the critical temperature of carbon dioxide allows the direct condensation of pressurized supercritical or gaseous carbon dioxide to form liquid carbon dioxide.

The liquefied carbon dioxide in stream 130 may then be passed to a flash cooler 248 where a portion of the stream may be flashed to provide cooling for the rest of the stream. Non-condensable gases, such as nitrogen and excess oxygen, are also purged from flash cooler 248 and vented via streams 131 and 135. The produced and recycled liquid carbon dioxide passes via stream 132 through heat exchanger 208 and passes via streams 137 and 138 to transport 250 and storage 252 facilities, respectively. It is understood that it is not necessary to condense all of the carbon dioxide in stream 129. Instead, a portion of the carbon dioxide gas may be recycled to mix with the oxygen upstream of the reaction chamber 210. This reduces heat exchanger and heat rejection duties.

Figure 5:
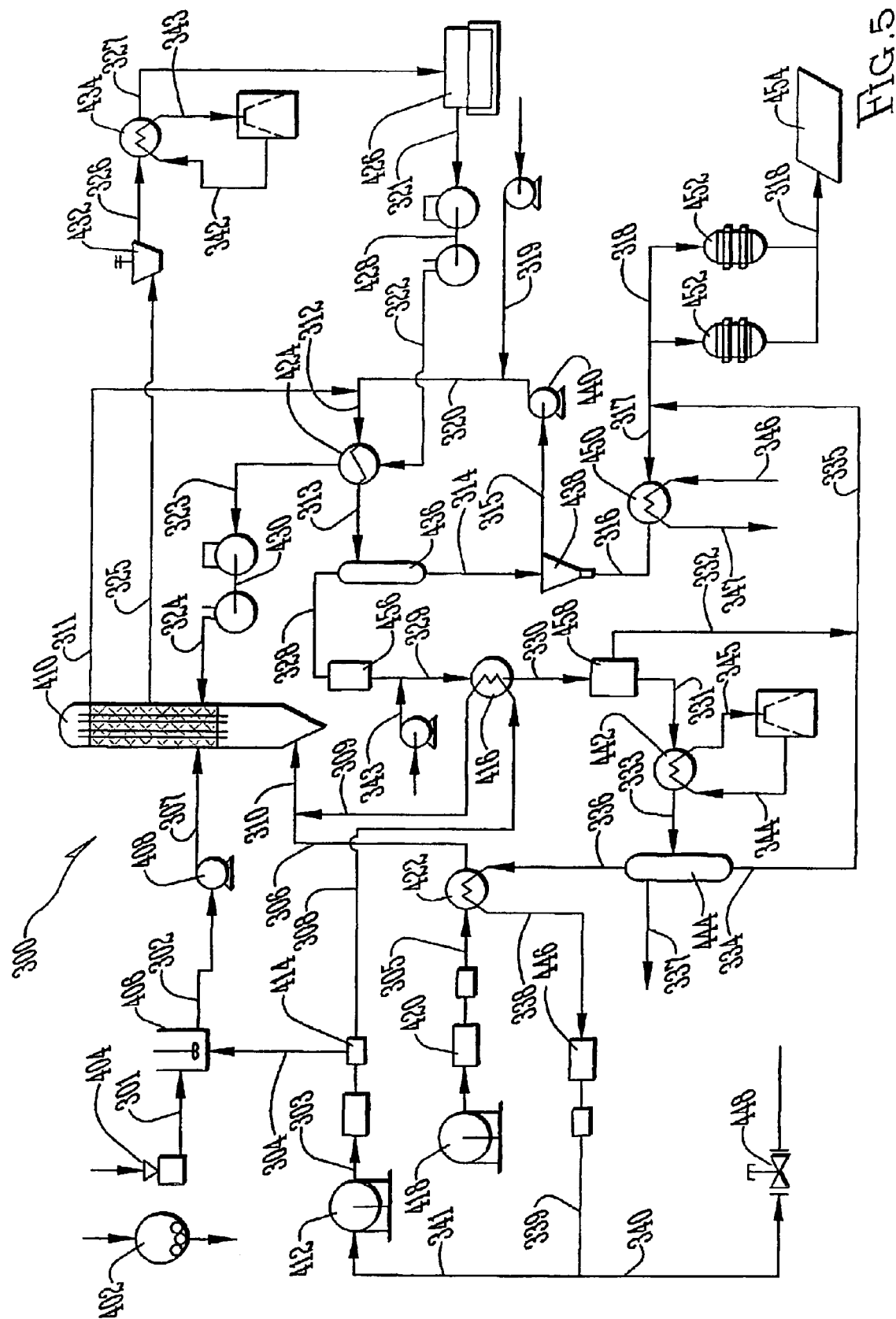
FIG. 5 is a schematic representation of an alternate embodiment of a power system incorporating the present invention for fuels containing ash or ash forming materials.

Referring to FIG. 5, the reference numeral 300 refers to an alternate embodiment of the integrated system of the present invention. In this embodiment, the fuel is a solid fossil fuel containing ash or ash forming materials such as bituminous coal. With slight modification to the fuel input equipment, the same embodiment can be used for liquid fuels containing ash or ash forming materials such as heavy oil and crude oil. Further still, sour gas may be used as a feedstock. The system may burn CO, $CS_2$, and $H_2S$ for energy and recover it as sulfuric acid or a sulfate salt. In addition, a Claus process could be integrated in the down stream catalyst, reintroducing $H_2S$ and catalytically converting $SO_x$ and $H_2S$ into $H_2O$ and molten/gaseous sulfur.

The solid ash or ash forming material containing fuel such as coal is sent to a ball mill, or similar device, 402 that pulverizes the solid fuel. From the ball mill, the solid fuel passes to a hopper pump 404 and passes via stream 301, at or near the system pressure, to a mixer 406. For the system depicted in FIG. 5, the system pressure is preferably within a range of from approximately 700 psia to approximately 2000 psia and is more preferably substantially within a range of from approximately 870 psia to approximately 1276 psia. This pressure range allows one to use standard equipment designs and encompasses the critical pressure of carbon dioxide (1,071 psi or 7.382 MPascal). In the later stages of the present system, when water and carbon dioxide are sequentially condensed, this system pressure range allows carbon dioxide condensation at the highest possible temperature. Water condensation is achieved at a useful temperature while optimizing system pressure and minimizing overall capital cost. Although the present system is discussed using coal as the fuel, it is understood that other fuels, such as fuel oil, may be used with the system. Of course, if the plant is designed to run on fuel oil only, the ball mill 402 and hopper pump 404 may be omitted and a high-pressure fuel oil pump inserted in their place.

Figure 9:
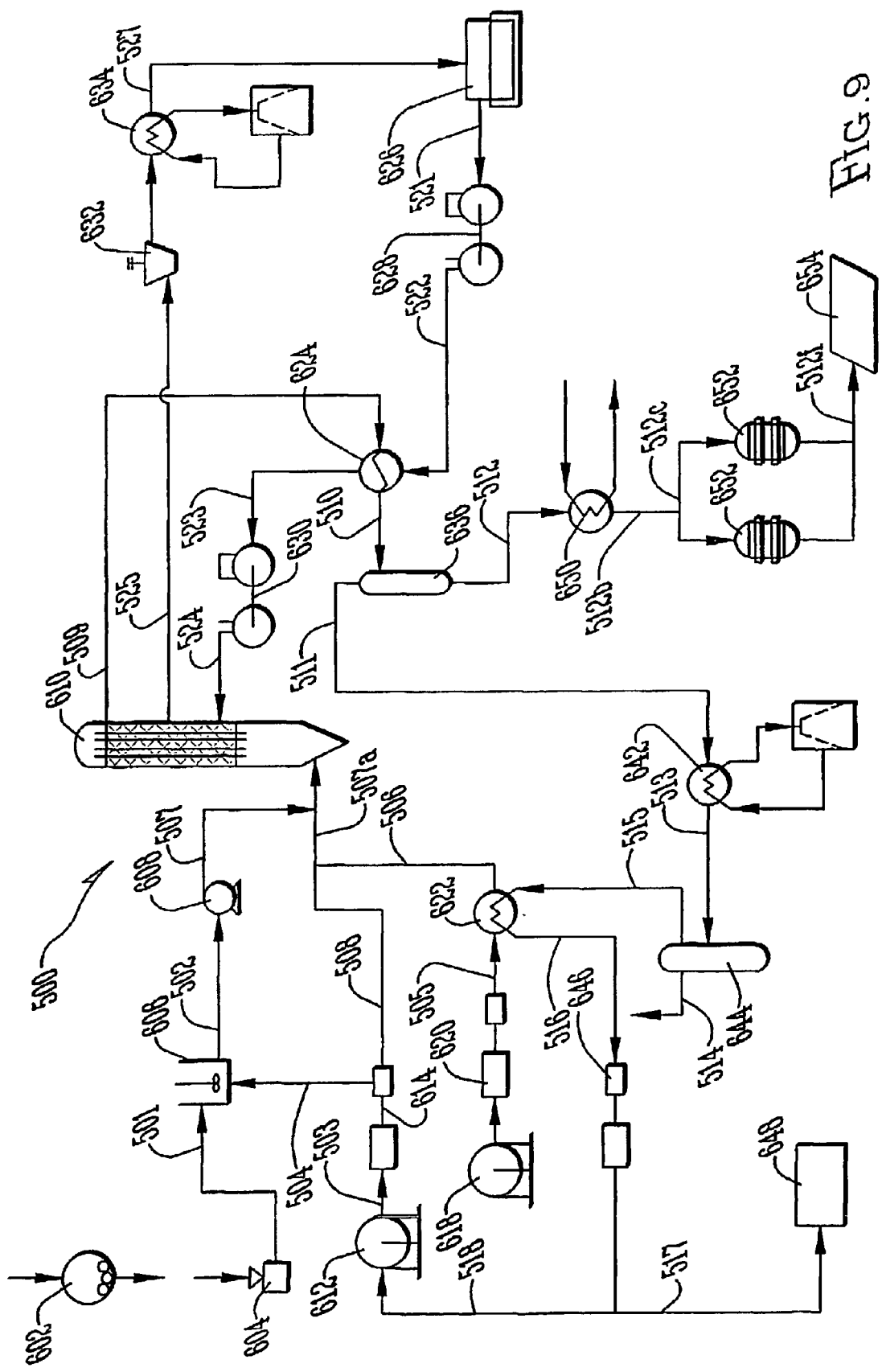
FIG. 9 is a schematic representation of an alternate embodiment of a power system incorporating the present invention.

As discussed in more detail below, liquid carbon dioxide is added to the mixer via stream 304. Water, surfactants, pH modifiers and other chemicals may also be added in the mixer. After mixing, the mixed fuel and carbon dioxide pass via stream 302 to pump 408 before passing to the reaction or combustion chamber 410 via stream 307. The fuel and carbon dioxide mixture may also be combined with an oxidant upstream of the reaction chamber (FIG. 9). In the case of fuel oil the mixer may or may not be used depending on the properties of the fuel oil. There may be an advantage to making an emulsion of fuel oil and liquid carbon dioxide prior to feeding the reaction chamber. Water and surfactants could potentially aid in the formation of fuel oil emulsions with low viscosity and adequate stability. The mixer may not be necessary, particularly for fuel oils, because when the carbon dioxide and coal mixture or the carbon dioxide and fuel oil emulsion enters the reaction chamber and flashes, the rapid expansion and phase change of the carbon dioxide provides strong mechanical shear and dispersion forces to aid in mixing.

Liquid carbon dioxide is stored in storage tank 412. Liquid carbon dioxide flows from the storage tank 412 to the pump 414 via stream 303, and pump 414 raises the pressure of the liquid carbon dioxide to the system pressure. Downstream from pump 414, the liquid carbon dioxide passes via streams 304 and 308 into the mixer 406 and heat exchanger 416, respectively. In a preferred embodiment, sufficient carbon dioxide passes to the mixer via stream 304 to provide a substantially equal mass of carbon dioxide and coal in the mixer. In a preferred embodiment, the carbon dioxide in stream 308 is initially a stream of liquid carbon dioxide. In order to achieve good mixing with the gaseous oxygen in stream 306, it is preferred to vaporize the carbon dioxide in stream 308 prior to mixing it with the oxygen in stream 306. This may be accomplished by passing stream 308 to heat exchanger 416 before the carbon dioxide passes via stream 309 to stream 306 for mixing with the oxygen to form stream 310.

Liquid oxygen is stored in storage tank 418. The pressurized oxygen gas may be obtained by pressurizing liquid oxygen and then heating and vaporizing it to approximately 240° K. in a counter-current heat exchanger (not shown). The cold liquid oxygen may be used to help cool the process streams in the air separation plant. The pressurized gaseous oxygen in stream 305 is further heated in a heat exchanger 422 that is used to cool the produced carbon dioxide. The pressurized oxygen passes from heat exchanger 422 via stream 306 and is ready for mixing with the carbon dioxide in stream 309. The quantity of oxygen in stream 306 is determined by the feed rate of fuel and the expected combustion products. In the preferred embodiment, the feed rates of fuel and oxygen are controlled to provide a slight excess of oxygen over the exact schoichiometric ratio between the fuel and oxygen. Prior to injection into reaction chamber, the oxygen gas in stream 306 is mixed with the carbon dioxide gas in stream 309 to reduce the peak concentrations of oxygen in the reaction chamber. In the preferred embodiment, equal masses of oxygen in stream 306 and carbon dioxide in stream 309 are used.

In the reaction chamber, the fuel and oxidant streams are combined in a series of starved-oxidant combustion steps to control peak temperatures and heat transfer. Even though diluted by large amounts of carbon dioxide, the partial pressure of oxygen in the reaction chamber will be quite high in the vicinity of the inlet nozzles. An igniter (not shown) may consist of an electrically heated refractory block in close proximity to the fuel and oxidant feed streams or a chemical such as triethyl aluminium that self-ignites upon exposure to oxygen. If nitrogen is not present, $NO_x$ gases are not produced. If nitrogen is present, $NO_x$ may be produced. Among other things, products of combustion or oxidation include combustion gases, including produced water in the form of steam, and ash particles. The products of combustion exit the reaction chamber via stream 311 and pass to heat exchanger 424, where the heat exchanger 424 removes heat from stream 311 and transfers it to stream 323 that forms part of the boiler feed water and steam loop.

A coolant, such as boiler feed water and steam, circulates through streams 321 through 327. Water is stored at ambient temperature and pressure in boiler water tank 426. Water passes from the boiler water tank 426 to pump 428 at ambient temperature and pressure via stream 321. This stream condition is set at ambient temperature in order to provide the greatest driving force through the steam turbine and thereby generate the most power from this process. Pump 428 pressurizes the water to an intermediate pressure that is preferably substantially within a range of from approximately 300 psia to approximately 600 psia and that is more preferably approximately 600 psia. The use of the intermediate pressure as part of a two-step pressure increase for the coolant provides a number of advantages. The use of the intermediate pressure allows the 1276 psia stream 312 to enter the heat exchanger 424 on the tube side and the 300 to 600 psia stream 322 to enter the heat exchanger 424 on the shell side. The shell side pressure of the heat exchanger 424 at the intermediate pressure of approximately 300–600 psia is much lower than the typical high-pressure steam pressure of 3,500 psia. This simplifies the design of heat exchanger 424 and adds to the durability of the system.

The pre-heated boiler feed water at the intermediate pressure passes from heat exchanger 424 to pump 430 in a liquid state via stream 323. Pump 430 raises the pressure of the pre-heated boiler feed water to a pressure that is preferably substantially within a range of from approximately 2000 psia to approximately 5000 psia and that is more preferably approximately 3,500 psia. The boiler feed water passes through the reaction chamber 410 in a heat exchange relationship with the combusting fuel so that the combusting fuel gives up its heat of combustion to the water and steam in the boiler tubes. In the preferred embodiment, sufficient heat transfer surface is available so that the products of combustion exit the reaction chamber 410 via stream 311 at approximately 820° K. or 1,016° F. The boiler feed water is converted to steam and passes via stream 325 to a steam turbine 432 for generating electricity before passing via stream 326 to condenser 434. Condensed water passes via stream 327 to the boiler water tank 426 for further circulation through streams 321–327.

Returning to the heat exchanger 424, the portion designed to extract heat from the exhaust gases is designed to operate at a pressure that is preferably substantially within a range of from approximately 700 psia to approximately 2000 psia and that is more preferably substantially within a range of from approximately 850 psia to approximately 1276 psia. The pressure is selected so that water condenses from the products of combustion at a temperature that is preferably above approximately 450° F. and that is more preferably above 500° F. One important advantage of operating the reaction chamber and heat exchanger at elevated pressure is that the latent heat of vaporization of the water in the products of combustion can be recovered. At the elevated system pressure, the vapor—liquid equilibrium saturation temperature of the water vapor is also elevated to a useful temperature preferably above 450° F. and more preferably above 500° F.). In conventional power plants operated at or near atmospheric pressure, the heat of vaporization energy of the water produced in the combustion process cannot be economically recovered because the vapor—liquid equilibrium saturation temperature of said water vapor is approximately 200° F.–220° F., which is too low. For example, the boiler feed water would typically have a temperature of about 80° F. and the amount of energy that the boiler feed water could absorb is limited to the enthalpy change between 80° F. and about 212° F. if perfect heat exchange were possible. Practically, perfect heat exchange is not economically possible and a significant thermal driving force is needed to achieve useful heat transfer. This means that the amount of exhaust gas water latent heat energy that could be practically absorbed by the boiler feed water is significantly less than the enthalpy change between 80° F. and about 212° F. At the typical system pressure of conventional systems, water condenses at a low temperature and there is simply an insufficient thermal driving force and an insufficient temperature rise in the coolant fluid for the economic recovery of the heat of vaporization of the produced water.

As mentioned above, it is understood that fuel oil may be used instead of coal, in which case, less ash and more water would be produced and the heat recovered from the latent heat of vaporization of produced water would be greater. The intermediate pressure would be adjusted to compensate for this.

Condensing the water and acid gases within the heat exchanger 424 also offers another advantage. During the condensation of water and acid gases, a natural particulate scrubbing action occurs. As the saturated gases are cooled below the saturation point, droplet formation will nucleate on ash particulates suspended in the gaseous stream. This condensation phase-change scrubbing phenomenon enhances the ash particle separation and enhances the particulate removal capabilities of the system. The heat exchanger 424 is also designed and operated so that the exit temperature of stream 313 is greater than the critical temperature of carbon dioxide. This provides for enhanced separation of condensed water and acid gases from the carbon dioxide and improves the quality of carbon dioxide produced and captured.

The cooled products of combustion, including gaseous carbon dioxide and condensed water, pass from heat exchanger 424 to knockout drum 436 via stream 313. In the knockout drum 436, the liquid water, dissolved acid and ash particulates are separated from the gaseous carbon dioxide stream. The separated water, acids, and ash flow from the knockout drum 436 to a hydro-cyclone 438 via stream 314 where the ash is separated from the water. The ash and a portion of the water flows from the hydro-cyclone via stream 316 into a cooler 450. From cooler 450, the cooled water and ash flows in stream 317 joins condensed water streams 334. 332 and 335 from knockout-drums 444 and 458 to form stream 318, which flows to pressure let-down devices 452. Separations devices such as filters or reverse osmosis systems 454, can be used to treat the ash and water effluent stream 318. A portion of the cleaned water from hydro-cyclone 438 passes via stream 315 to pump 440 and is then pumped via stream 320 back into stream 312 upstream of the heat exchanger 424. Additives, such as ammonia, caustic, or hydrated lime may be added to this recycled water via stream 319 to adjust the pH of the recycle water stream. The advantage of recycling this water is to immediately cool stream 311. Upon water injection, the temperature in stream 311 would drop to or near the water liquid—vapor equilibrium temperature at the system pressure (570° K., 566° F.). The sensible heat energy in the combustion gases exiting the reaction chamber at 1,016° F. would be converted into latent heat in water vapor at a significantly lower temperature. In the present system, this temperature is approximately 566° F. Designing and building a heat exchanger 424 for a peak temperature and a shell pressure of approximately 566° F. and approximately 600 psia is easier than designing one for a peak temperature of approximately 1,016° F. and approximately 1276 psia. In addition to the benefits of temperature reduction, steam vapor condensation has excellent heat transfer characteristics and the additional water flow will help ensure ash particles are continually flushed through the heat exchanger.

The gaseous stream 328 exiting knockout vessel 436 may contain carbon dioxide and nitrogen. There will also be oxygen and some NO and $SO_2$. The NO and $SO_2$ are oxidized with the residual oxygen in the catalyst bed, 456, into $NO_2$ and $SO_3$. Stream 329 is heat exchanged with stream 308 in heat exchanger 416. As stream 329 is cooled into stream 330, additional water will be condensed from the gas phase. The fully oxidized species, $NO_2$ and $SO_3$, are readily water scrubbed and converted into recoverable materials. This water and acid is recovered in stream 332. The recovered $NO_2$ and $SO_3$ are separated into Streams 331 and 332 in the knock-out drum 458. The cooled carbon dioxide, nitrogen and oxygen enter the condenser 442 via Stream 331.

Stream 343 may be used to provide pH adjustment and other chemicals as needed. Such additive chemicals may be used to treat condensed acids. Upon reaching the dew point, the sulfur trioxide, $SO_3$, reacts with water to form sulfuric acid which condenses into the liquid phase. The $NO_2$ may be reacted with a suitable reductant such as formic acid or hydroxylamine to form nitrogen gas according to the hydrothermal reactions:

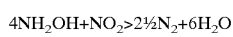

or,

Another potential reaction is the use of oxalic acid and hydroxylamine to convert nitrogen oxides to ammonium nitrate without the subsequent production of nitrogen monoxide:

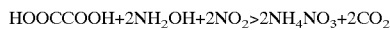

The separation of oxides of sulfur and nitrogen from the bulk gas stream occurs as an intrinsic simultaneous part of the subject system operation. The recovery of the heat of vaporization of the produced water and the condensation of the carbon dioxide create two separate phase change operations which provide ample opportunity and driving force for the conversion, collection, and separation of oxides of nitrogen and sulfur.

In an alternate embodiment depicted in FIG. 9, the water, ash and condensed acid in stream 512 are simply cooled and removed from the system via pressure let-down vessels or other pressure reduction devices. It is highly likely that the calcium and magnesium oxides in the coal ash will react with the sulfuric acid in the water to produce calcium and magnesium sulfate. The produced water will be treated and released or used as cooling water.

Returning to the embodiment depicted in FIG. 5, the gaseous carbon dioxide leaves the knockout drum 458 via stream 331. Stream 331 passes to condenser 442 where the carbon dioxide is substantially condensed and liquefied. The liquefied carbon dioxide in stream 333 may then be passed to a flash cooler 444 where a portion of the stream may be flashed to provide cooling for the rest of the stream. In the preferred embodiment, approximately 20 percent of the carbon dioxide is flashed. When flashed, the liquid carbon dioxide will cool via Joule-Thompson expansion. This cooling effect can be used to cool the remainder of the liquid carbon dioxide in stream 336. Non-condensable gases, such as nitrogen, excess oxygen, and argon, are also purged from flash cooler and vented via stream 337. With the presence of this vent, it is clear to those skilled in the art that it may not be necessary to use pure oxygen. Instead, the system may use 90 to 96% oxygen produced by pressure swing adsorption devices or may use air or oxygen enriched air. The produced and recycled liquid carbon dioxide passes via stream 336 through heat exchanger 422 and passes via stream 338 to pump 446 that passes the carbon dioxide via stream 341 and 340 to storage 412 and transport 448, respectively. It is understood that it is not necessary to condense all of the carbon dioxide in stream 331. Instead, a portion of the carbon dioxide gas may be recycled to mix with the oxygen upstream of the reaction chamber 410. This reduces heat exchanger and heat rejection duties.

Figure 10:
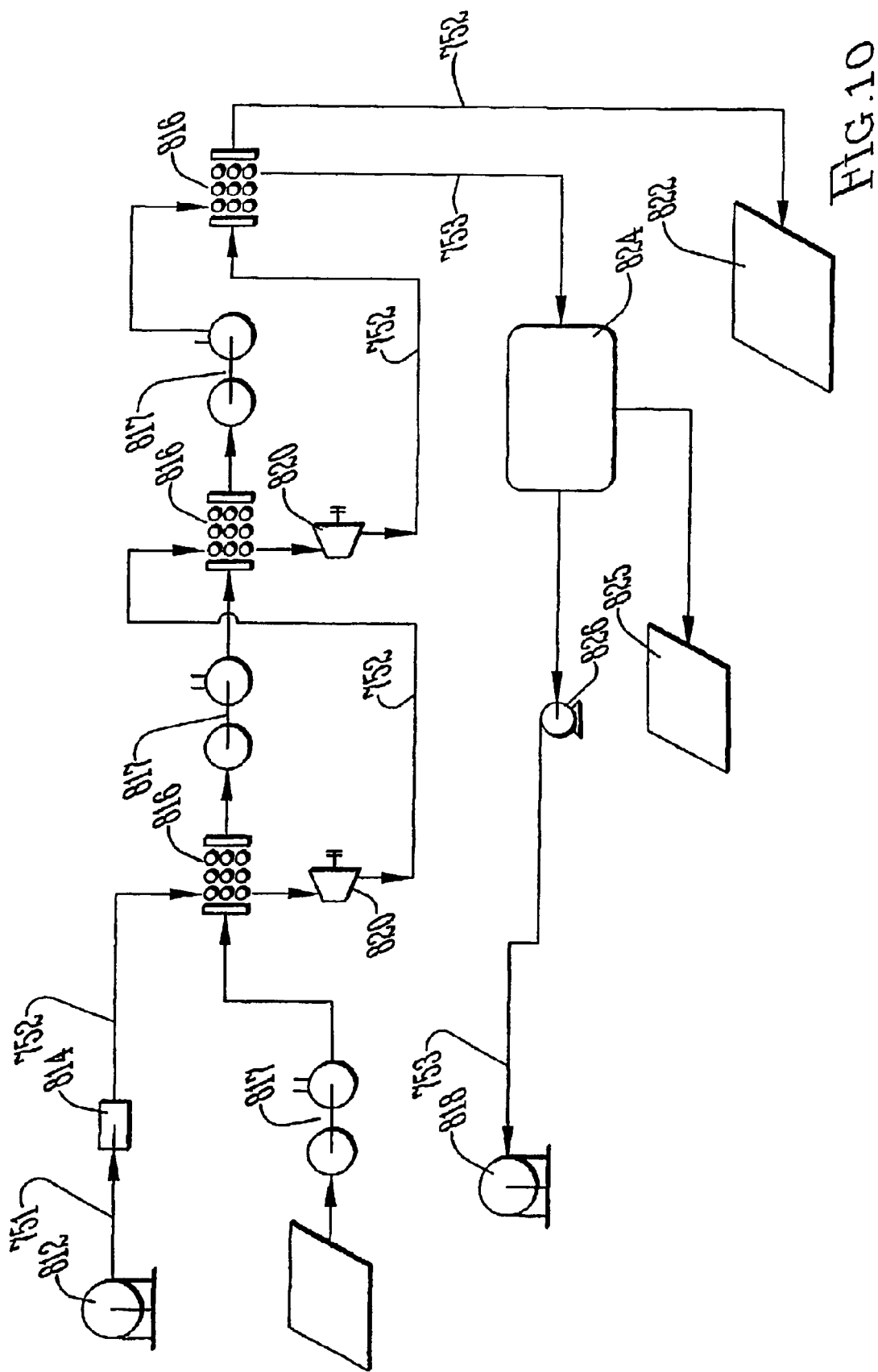
FIG. 10 is a schematic representation of a portion of an alternate embodiment of a power system incorporating the present invention, providing for the use of liquid carbon dioxide to generate energy for an air separation plant.

An optional use for the excess liquid carbon dioxide is depicted in FIG. 10. The excess liquid carbon dioxide may be used to provide the motive energy required to produce liquid oxygen. In this embodiment, the liquid carbon dioxide from storage tank 812 passes via stream 751 to pump 814 where it is pumped to a pressure greater than its critical pressure (approximately 7.382 MPa or 1,071 psia). The high-pressure carbon dioxide then passes via stream 752 to heat exchanger 816 where it is heated above the critical point with waste heat. Since the critical temperature of carbon dioxide is so low (304.19° K. or 87.5° F.), waste heat can be used to convert the pressurized liquid carbon dioxide into gaseous carbon dioxide. This heat may come from various parts of the power plant or from the heat generated by the air and oxygen compressors 817 in the air separation plant. The high-pressure gaseous carbon dioxide then passes through a turbine 820 to generate motive energy to drive the compressors 817 in the air separation plant. This can be a multi stage operation with supplemental heating of the carbon dioxide between the intermediate stages. The spent carbon dioxide may be released to the atmosphere at 822, and the liquid oxygen produced may pass via stream 753 through a balance of air separation plant 824, with vent 825, and a pump 826 to a storage tank 818. This approach makes use of the excellent natural properties of carbon dioxide.

Load leveling of electric power export is achieved by changing the amount of electric energy directed to the production of oxygen. In a diurnal cycle, during periods of low electricity demand, a larger portion of the plant output is devoted to producing liquid oxygen. During periods of peak electrical demand, the stored liquid oxygen is used and a smaller portion of the plants electric energy is directed to the air separation plant.

Other modifications, changes and substitutions are intended in the foregoing, and in some instances, some features of the invention will be employed without a corresponding use of other features. For example, the water recycle via streams such as 120, 123, and 315, need not be or may be used in connection with other designs. Also, the two-stage pressure step-up of the coolant via streams 139–144, 321–324 and 521–524 need not be used or may be used in connection with other designs. Further, the location of heat exchangers may vary greatly, and the various streams may be routed to particular heat exchangers in any number of configurations. Additionally, the system may be used with or without combining carbon dioxide with the fuel, oxygen, or air upstream of the reaction chamber or in the reaction chamber. Further still, it is understood that the carbon dioxide capture and separation need not be used and that the water capture and separation need not be used. Similarly, the selective catalytic reduction or catalytic oxidation need not be used. Further still, it is understood that all examples and quantitative values and ranges, such as temperatures and pressures, are given by way of illustration and are not intended as limitations as to the scope of the invention. Accordingly, it is appropriate that the appended claims be construed broadly and in a manner consistent with the scope of the invention.

Figure 11:
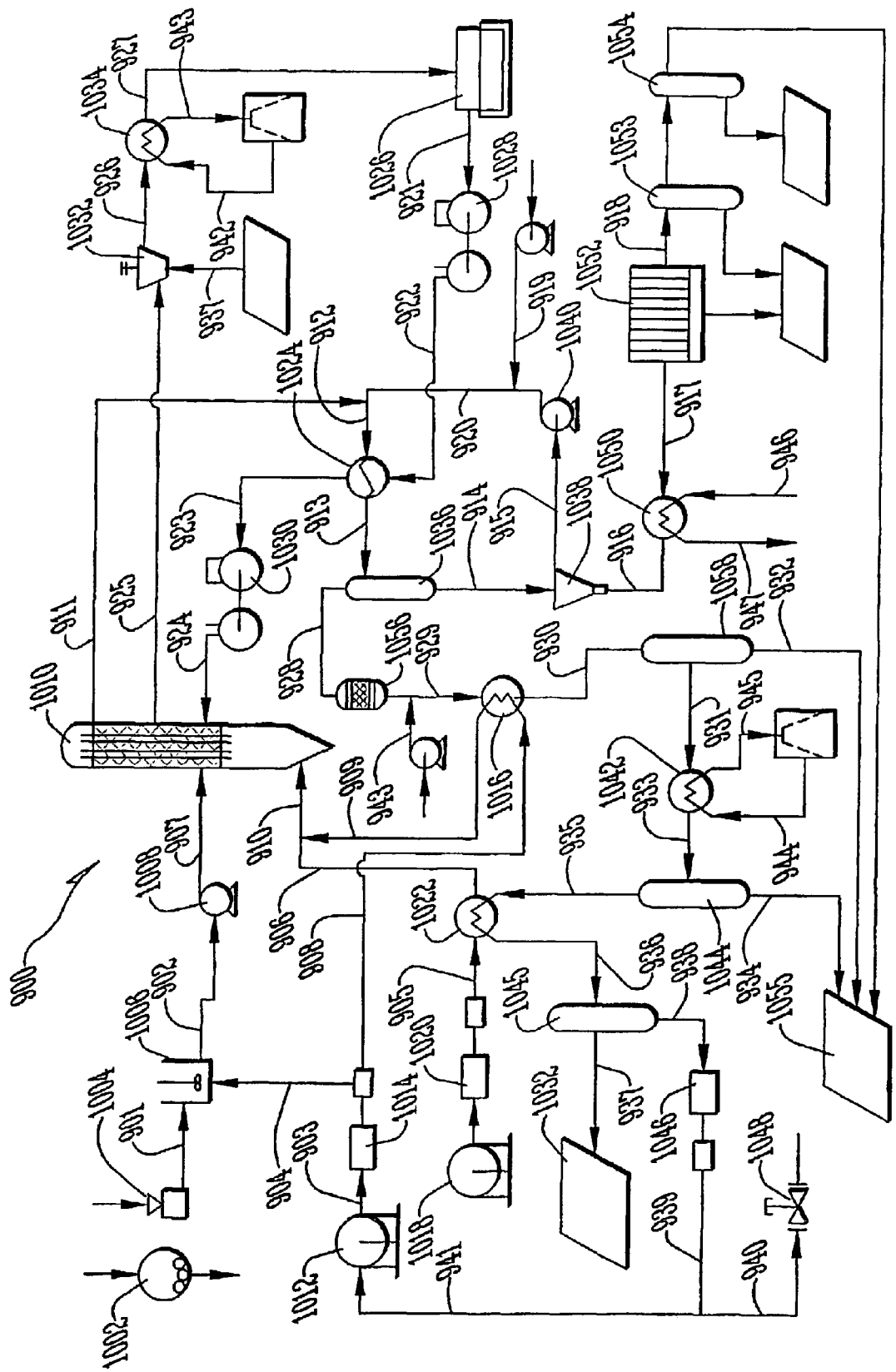
FIG. 11 is a schematic representation of a portion of an alternate embodiment of a power system incorporating the present invention, providing for the gasification of solid or liquid fuels to produce a clean synthesis gas which may be used to generate energy in a standard Rankine cycle or combined cycle power plant.

Referring to FIG. 11, the reference numeral 900 refers to an alternate embodiment of the integrated system of the present invention. In this embodiment, the fuel is a solid fossil fuel containing ash or ash forming materials such as bituminous coal. With slight modification to the fuel input equipment, the same embodiment can be used for liquid fuels containing ash or ash forming materials such as heavy oil and crude oil. The fuel is partially oxidized or gasified to produce an energy containing synthesis gas. The production of the synthesis gas uses a sub-stoichiometric amount of oxygen and therefore requires less oxidant than complete combustion.

The solid ash or ash forming material containing fuel such as coal is sent to a ball mill, or similar device, 1002 that pulverizes the solid fuel. From the ball mill, the solid fuel passes to a hopper pump 1004 and passes via stream 901, at or near the system pressure, to a mixer 1006. For the system depicted in FIG. 11, the system pressure is preferably within a range of from approximately 700 psia to approximately 2000 psia and is more preferably substantially within a range of from approximately 870 psia to approximately 1276 psia. This pressure range allows one to use standard equipment designs and encompasses the critical pressure of carbon dioxide (1,071 psi or 7.382 MPascal). In the later stages of the present system, when water and carbon dioxide are sequentially condensed, this system pressure range allows carbon dioxide condensation at the highest possible temperature. Water condensation is achieved at a useful temperature while optimizing system pressure and minimizing overall capital cost. Although the present system is discussed using coal as the fuel, it is understood that other fuels, such as fuel oil, may be used with the system. Of course, if the plant is designed to run on fuel oil only, the ball mill 1002 and hopper pump 1004 may be omitted and a high-pressure fuel oil pump inserted in their place.

As discussed in more detail below, liquid carbon dioxide is added to the mixer via stream 904. Water, surfactants, pH modifiers and other chemicals may also be added in the mixer. After mixing, the mixed fuel and carbon dioxide pass via stream 902 to pump 1008 before passing to the reaction or combustion chamber 1010 via stream 907. The fuel and carbon dioxide mixture may also be combined with an oxidant upstream of the reaction chamber (FIG. 9). In the case of fuel oil the mixer may or may not be used depending on the properties of the fuel oil. There may be an advantage to making an emulsion of fuel oil and liquid carbon dioxide prior to feeding the reaction chamber. Water and surfactants could potentially aid in the formation of fuel oil emulsions with low viscosity and adequate stability. The mixer may not be necessary, particularly for fuel oils, because when the carbon dioxide and coal mixture or the carbon dioxide and fuel oil emulsion enters the reaction chamber and flashes, the rapid expansion and phase change of the carbon dioxide provides strong mechanical shear and dispersion forces to aid in mixing.

Liquid carbon dioxide is stored in storage tank 1012. Liquid carbon dioxide flows from the storage tank 1012 to the pump 1014 via stream 903, and pump 1014 raises the pressure of the liquid carbon dioxide to the system pressure. Downstream from pump 1014, the liquid carbon dioxide passes via streams 904 and 908 into the mixer 1006 and heat exchanger 1016, respectively. In a preferred embodiment, sufficient carbon dioxide passes to the mixer via stream 904 to provide a substantially equal mass of carbon dioxide and coal in the mixer. In a preferred embodiment, the carbon dioxide in stream 908 is initially a stream of liquid carbon dioxide. In order to achieve good mixing with the gaseous oxygen in stream 906, it is preferred to vaporize the carbon dioxide in stream 908 prior to mixing it with the oxygen in stream 906. This may be accomplished by passing stream 908 to heat exchanger 1016 before the carbon dioxide passes via stream 909 to stream 906 for mixing with the oxygen to form stream 910.

Liquid oxygen is stored in storage tank 1018. The pressurized oxygen gas may be obtained by pressurizing liquid oxygen and then heating and vaporizing it to approximately 240° K. in a counter-current heat exchanger (not shown). The cold liquid oxygen may be used to help cool the process streams in the air separation plant. The pressurized gaseous oxygen in stream 905 is further heated in a heat exchanger 1022 that is used to cool the produced carbon dioxide. The pressurized oxygen passes from heat exchanger 1022 via stream 906 and is ready for mixing with the carbon dioxide in stream 909. The quantity of oxygen in stream 906 is determined by the feed rate of fuel and the expected combustion products. In the preferred embodiment, the feed rates of fuel and oxygen are controlled to provide a sto-ichiometric ratio between the fuel and oxygen required for optimum gasification of the fuel. Prior to injection into reaction chamber 1010, the oxygen gas in stream 906 is mixed with the carbon dioxide gas in stream 909 to reduce the peak concentrations of oxygen in the reaction chamber. In the preferred embodiment, equal masses of oxygen in stream 906 and carbon dioxide in stream 909 are used.

In the reaction chamber 1010, the fuel and oxidant streams are combined in a series of starved-oxidant combustion steps to control peak temperatures and heat transfer. Even though diluted by large amounts of carbon dioxide, the partial pressure of oxygen in the reaction chamber will be quite high in the vicinity of the inlet nozzles. An igniter (not shown) may consist of an electrically heated refractory block in close proximity to the fuel and oxidant feed streams or a chemical such as triethyl aluminium that self-ignites upon exposure to oxygen. If nitrogen is not present, $NO_x$ gases are not produced. If nitrogen is present, $NO_x$ may be produced. Among other things, products of partial combustion or oxidation and water-gas shift reactions include combustion gases such as carbon monoxide, hydrogen, carbon dioxide, methane and produced water in the form of steam, and ash particles. The products of partial combustion or gasification exit the reaction chamber via stream 911 and pass to heat exchanger 1024, where the heat exchanger 1024 removes heat from stream 911 and transfers it to stream 923 that forms part of the boiler feed water and steam loop.

A coolant, such as boiler feed water and steam, circulates through streams 921 through 927. Water is stored at ambient temperature and pressure in boiler water tank 1026. Water passes from the boiler water tank 1026 to pump 1028 at ambient temperature and pressure via stream 921. This stream condition is set at ambient temperature in order to provide the greatest driving force through the steam turbine and thereby generate the most power from this process. Pump 1028 pressurizes the water to an intermediate pressure that is preferably substantially within a range of from approximately 300 psia to approximately 600 psia and that is more preferably approximately 600 psia. The use of the intermediate pressure as part of a two-step pressure increase for the coolant provides a number of advantages. The use of the intermediate pressure allows the 1,276 psia stream 912 to enter the heat exchanger 1024 on the tube side and the 300 to 600 psia stream 922 to enter the heat exchanger 1024 on the shell side. The shell side pressure of the heat exchanger 1024 at the intermediate pressure of approximately 300–600 psia is much lower than the typical high-pressure steam pressure of 3,500 psia. This simplifies the design of heat exchanger 1024 and adds to the durability of the system.

The pre-heated boiler feed water at the intermediate pressure passes from heat exchanger 1024 to pump 1030 in a liquid state via stream 923. Pump 1030 raises the pressure of the preheated boiler feed water to a pressure that is preferably substantially within a range of from approximately 2,000 psia to approximately 5,000 psia and that is more preferably approximately 3,500 psia. The boiler feed water passes through the reaction chamber 1010 in a heat exchange relationship with the combusting fuel so that the combusting fuel gives up its heat of combustion to the water and steam in the boiler tubes. In the preferred embodiment, sufficient heat transfer surface is available so that the products of partial combustion exit the reaction chamber 1010 via stream 911 at approximately 820° K. or 1,016° F. The boiler feed water is converted to steam and passes via stream 925 to a steam turbine, boiler or combined cycle power plant 1032 for generating electricity before passing via stream 926 to condenser 1034. Condensed water passes via stream 927 to the boiler water tank 1026 for further circulation through streams 921–927.

Returning to the heat exchanger 1024, the portion designed to extract heat from the exhaust gases is designed to operate at a pressure that is preferably substantially within a range of from approximately 700 psia to approximately 2,000 psia and that is more preferably substantially within a range of from approximately 850 psia to approximately 1,276 psia. The pressure is selected so that water condenses from the products of combustion at a temperature that is preferably above approximately 550° F. and that is more preferably above 500° F. One important advantage of operating the reaction chamber and heat exchanger at elevated pressure is that the latent heat of vaporization of the water in the products of combustion can be recovered. At the elevated system pressure, the vapor—liquid equilibrium saturation temperature of the water vapor is also elevated to a useful temperature (preferably above 550° F. and more preferably above 500° F.). In conventional power plants operated at or near atmospheric pressure, the heat of vaporization energy of the water produced in the combustion process cannot be economically recovered because the vapor—liquid equilibrium saturation temperature of said water vapor is approximately 200° F.–220° F., which is too low. For example, the boiler feed water would typically have a temperature of about 80° F. and the amount of energy that the boiler feed water could absorb is limited to the enthalpy change between 80° F. and about 212° F. if perfect heat exchange were possible. Practically, perfect heat exchange is not economically possible and a significant thermal driving force is needed to achieve useful heat transfer. This means that the amount of exhaust gas water latent heat energy that could be practically absorbed by the boiler feed water is significantly less than the enthalpy change between 80° F. and about 212° F. At the typical system pressure of conventional systems, water condenses at a low temperature and there is simply an insufficient thermal driving force and an insufficient temperature rise in the coolant fluid for the economic recovery of the heat of vaporization of the produced water.

As mentioned above, it is understood that fuel oil may be used instead of coal, in which case, less ash and more water would be produced and the heat recovered from the latent heat of vaporization of produced water would be greater. The intermediate pressure would be adjusted to compensate for this.

Condensing the water and acid gases within the heat exchanger 1024 also offers another advantage. During the condensation of water and acid gases, a natural particulate scrubbing action occurs. As the saturated gases are cooled below the saturation point, droplet formation will nucleate on ash particulates suspended in the gaseous stream. This condensation phase-change scrubbing phenomenon enhances the ash particle separation and enhances the particulate removal capabilities of the system. The heat exchanger 1024 is also designed and operated so that the exit temperature of stream 913 is greater than the critical temperature of carbon dioxide, ammonia, hydrogen sulfide, carbonyl sulfide, carbon disulfide and carbon monoxide. This provides for enhanced separation of condensed water and sulfur containing gases from the synthesis gas and improves the quality of synthesis gas and carbon dioxide produced and captured.

The cooled synthesis gas or products of partial combustion, including gaseous carbon dioxide, hydrogen, ammonia, carbon monoxide, methane, hydrogen sulfide, carbonyl sulfide, carbon disulfide and condensed water, pass from heat exchanger 1024 to knockout drum 1036 via stream 913. In the knockout drum 1036, the liquid water, ash particulates and some dissolved gases are separated from the synthesis gas stream. The separated water, acids, and ash flow from the knockout drum 1036 to a hydro-cyclone 1038 via stream 914 where the ash is separated from the water. The ash and a portion of the water flows from the hydrocyclone via stream 916 into a cooler 1050. From there the cooled water and ash flows via streams 917 and 918 to separations devices such as a filter 1052, and reverse osmosis system 1053, and knockout drum 1054. Sour gases recovered from the final waste water are returned for processing to the Claus plant 1055. The other portion of the water from the hydrocyclone passes via stream 915 to pump 1040 and is then pumped via stream 920 back into stream 911 upstream of the heat exchanger 1024. Additives, such as oxygen, ammonia, caustic, or hydrated lime may be added to this recycled water via stream 919 to adjust the pH of the recycle water stream. The advantage of recycling this water is to immediately cool stream 911. Upon water injection, the temperature in stream 911 would drop to or near the water liquid—vapor equilibrium temperature at the system pressure (570° K., 566° F.). The sensible heat energy in the combustion gases exiting the reaction chamber at 1,016° F. would be converted into latent heat in water vapor at a significantly lower temperature. In the present system, this temperature is approximately 566° F. Designing and building a heat exchanger 1024 for a peak temperature and a shell pressure of approximately 566° F. and approximately 600 psia is easier than designing one for a peak temperature of approximately 1,016° F. and approximately 1,276 psia. In addition to the benefits of temperature reduction, steam vapor condensation has excellent heat transfer characteristics and the additional water flow will help ensure ash particles are continually flushed through the heat exchanger.

The gaseous stream 928 exiting knockout vessel 1036 may contain synthesis gas, carbon dioxide and nitrogen. The synthesis gas may contain hydrogen, methane, $NH_3$, NO, $H_2S$, COS, $CS_2$ and potentially $SO_2$. The COS and $CS_2$ are reduced by reaction with hydrogen in the catalyst bed, 1056, into $CH_4$, $H_2O$ and $H_2S$. A catalyst bed could also be used to achieve a water-gas shift reaction to convert carbon monoxide and water into carbon dioxide and hydrogen. Stream 929 is heat exchanged with stream 908 in heat exchanger 1016. Stream 943 may be used to provide pH adjustment and other chemicals as needed. Such additive chemicals may be used to treat condensed acids and sulfur containing gases. As stream 929 is cooled into stream 930, additional water will be condensed from the gas phase. At temperatures below 100° F. and pressures above 600 psia, $H_2S$, COS, and $CS_2$ can be condensed into liquids. A portion of the $H_2S$ is readily water scrubbed and converted into recoverable materials. This water and dissolved and condensed acid gas stream is recovered in stream 932. The condensed and recovered $NH_3$, $H_2S$, COS, and $CS_2$ are separated into Streams 931 and 932 in the knockout drum 1058. The cooled carbon dioxide, carbon monoxide, methane nitrogen and hydrogen enter the condenser 1042 via Stream 931.

The separation of sulfur containing gases from the bulk gas stream occurs as an intrinsic, simultaneous part of the system operation. The recovery of the heat of vaporization of the produced water and the condensation of the carbon dioxide create two separate phase change operations that provide ample opportunity and driving force for the conversion, collection, and separation of oxides of nitrogen and sulfur containing gases.

In the embodiment depicted in FIG. 11, the synthesis gas leaves the knockout drum 1058 via stream 931. Stream 931 passes to condenser 1042 where the carbon dioxide and hydrogen sulfide is substantially condensed and liquefied. The liquefied carbon dioxide and hydrogen sulfide in stream 933 may then be passed to a knockout drum 1044 where the liquid carbon dioxide and hydrogen sulfide is separated from the synthesis gas and sent via stream 934 to a Claus plant 1055 for conversion to elemental sulfur. In the case where additional cooling of the synthesis gas stream 935 was available by heat exchange with oxygen stream 905 in heat exchanger 1022, additional carbon dioxide may be condensed and removed via stream 938 in knockout vessel 1045. Non-condensable synthesis gases, such as nitrogen, carbon monoxide, methane nitrogen, hydrogen and argon, are collected from the knockout drum 1045 and directed to the combined cycle power plant 1032 via stream 937. The use of the synthesis gas in a combined cycle power plant comprising a gas turbine and a boiler and steam turbine is the preferred embodiment. Alternately, the synthesis gas could be used directly in a steam boiler. This synthesis gas fired steam boiler could be coupled to or independent of the hot water or steam flow in stream 925. Since the synthesis gas can be a mixture of combustible gases and non-combustible gases, it is clear to those skilled in the art that it may not be necessary to use pure oxygen in the initial gasification or partial combustion step. Instead, the system may use 90 to 96% oxygen produced by pressure swing adsorption devices or may use air or oxygen enriched air. The produced and recycled liquid carbon dioxide passes via stream 935 through heat exchanger 1022, passes via stream 936 through knockout drum 1045, and passes via stream 938 to pump 1046 that passes the carbon dioxide via stream 941 and 940 to storage 1012 and transport 1048, respectively. It is understood that it is not necessary to condense all of the carbon dioxide in stream 931. Instead, a portion of the carbon dioxide gas may be recycled to mix with the oxygen upstream of the reaction chamber 1010. This reduces heat exchanger and heat rejection duties.

What is claimed is:

1. A method of operating a power plant, comprising:
passing a fossil fuel into a combustion chamber;
passing an oxidant into said combustion chamber, said oxidant comprising oxygen and carbon dioxide;
combusting said fossil fuel within said combustion chamber at a first pressure, said first pressure being substantially within a range of from approximately 700 psia to approximately 2000 psia; and
passing a coolant having a heat exchange relationship with said combusting fossil fuel and a heat sink having a first temperature;
said first pressure being equal to or greater than a liquid-vapor equilibrium pressure of carbon dioxide at said first temperature of said heat sink;
passing products of partial combustion from said combustion chamber to a heat exchanger;
condensing water from said products of partial combustion at a second pressure within said heat exchanger, said second pressure being selected so that said water condenses from said products of partial combustion at a temperature above approximately 450° F.; and
passing said products of partial combustion to a boiler.

2. A method of operating a power plant, comprising:
passing a fossil fuel into a combustion chamber;
passing an oxidant into said combustion chamber, said oxidant comprising oxygen and carbon dioxide;
combusting said fossil fuel within said combustion chamber at a first pressure, said first pressure being substantially within a range of from approximately 700 psia to approximately 2000 psia; and
passing a coolant having a heat exchange relationship with said combusting fossil fuel and a heat sink having a first temperature;

said first pressure being equal to or greater than a liquid-vapor equilibrium pressure of carbon dioxide at said first temperature of said heat sink;

passing products of partial combustion from said combustion chamber to a heat exchanger;

condensing water from said products of partial combustion at a second pressure within said heat exchanger, said second pressure being selected so that said water condenses from said products of partial combustion at a temperature above approximately 450° F.; and passing said products of partial combustion to a gas turbine.

3. A method of operating a power plant, comprising:

passing a fossil fuel into a combustion chamber;

passing an oxidant into said combustion chamber, said oxidant comprising oxygen and carbon dioxide;

combusting said fossil fuel within said combustion chamber at a first pressure, said first pressure being substantially within a range of from approximately 700 psia to approximately 2000 psia; and passing a coolant having a heat exchange relationship with said combusting fossil fuel and a heat sink having a first temperature;

said first pressure being equal to or greater than a liquid-vapor equilibrium pressure of carbon dioxide at said first temperature of said heat sink;

passing products of partial combustion from said combustion chamber to a heat exchanger;

condensing water from said products of partial combustion at a second pressure within said heat exchanger, said second pressure being selected so that said water condenses from said products of partial combustion at a temperature above approximately 450° F.; and passing said products of partial combustion to a combined cycle power plant.

4. A method of operating a power plant, comprising:

passing a fossil fuel into a combustion chamber;

passing an oxidant into said combustion chamber, said oxidant comprising oxygen and carbon dioxide;

combusting said fossil fuel within said combustion chamber at a first pressure, said first pressure being substantially within a range of from approximately 700 psia to approximately 2000 psia; and passing a coolant having a heat exchange relationship with said combusting fossil fuel and a heat sink having a first temperature;

said first pressure being equal to or greater than a liquid-vapor equilibrium pressure of carbon dioxide at said first temperature of said heat sink;

passing products of partial combustion from said combustion chamber to a heat exchanger;

condensing water from said products of partial combustion at a second pressure within said heat exchanger, said second pressure being selected so that said water condenses from said products of partial combustion at a temperature above approximately 450° F.; and passing said products of partial combustion to a chemical synthesis plant.

\* \* \* \* \*